US008282691B2

(12) United States Patent
Goodenough et al.

(10) Patent No.: US 8,282,691 B2
(45) Date of Patent: Oct. 9, 2012

(54) CATHODE MATERIALS FOR SECONDARY (RECHARGEABLE) LITHIUM BATTERIES

(75) Inventors: John B. Goodenough, Austin, TX (US); Akshaya K. Padhi, La Salle, IL (US); Kirakoda S. Nanjundaswamy, Ambler, PA (US); Christian Masquelier, Boulogne (FR)

(73) Assignee: Hydro-Quebec, Montreal, Quebec (CA)

( * ) Notice: Subject to any disclaimer, the term of this patent is extended or adjusted under 35 U.S.C. 154(b) by 0 days.

(21) Appl. No.: 13/269,299

(22) Filed: Oct. 7, 2011

(65) Prior Publication Data
US 2012/0039784 A1 Feb. 16, 2012

Related U.S. Application Data

(63) Continuation of application No. 12/952,978, filed on Nov. 23, 2010, which is a continuation of application No. 11/179,617, filed on Jul. 13, 2005, now abandoned, which is a continuation of application No. 10/902,142, filed on Jul. 30, 2004, now abandoned, which is a continuation of application No. 10/307,346, filed on Dec. 2, 2002, now abandoned, which is a continuation of application No. 08/998,264, filed on Dec. 24, 1997, now Pat. No. 6,514,640, which is a continuation-in-part of application No. 08/840,523, filed on Apr. 21, 1997, now Pat. No. 5,910,382.

(60) Provisional application No. 60/032,346, filed on Dec. 4, 1996, provisional application No. 60/016,060, filed on Apr. 23, 1996.

(51) Int. Cl.
*H01M 4/82* (2006.01)
*H01M 4/58* (2010.01)
*H01M 4/13* (2010.01)

(52) U.S. Cl. ............... 29/623.1; 429/218.1; 429/221
(58) Field of Classification Search ............... None
See application file for complete search history.

(56) References Cited

U.S. PATENT DOCUMENTS

| 2,736,708 A | 2/1956 | Crowley et al. | 252/62.5 |
| 4,049,887 A | 9/1977 | Whittingham | 429/112 |
| 4,233,375 A | 11/1980 | Whittingham | 429/194 |
| 4,302,518 A | 11/1981 | Goodenough et al. | 429/104 |
| 4,366,215 A | 12/1982 | Coetzer et al. | 429/199 |
| 4,465,747 A | 8/1984 | Evans | 429/194 |

(Continued)

FOREIGN PATENT DOCUMENTS

CA 2251709 10/1997

(Continued)

OTHER PUBLICATIONS

Padhi, A.K. et al., "LiFePO4: A Novel Cathode Material for Rechargeable Lithium Batteries," The Electrochemical Society, Inc., Meeting Abstracts, vol. 96-1, Spring Meeting, Los Angeles, CA Mar. 22, 1996.*

(Continued)

*Primary Examiner* — Barbara Gilliam
*Assistant Examiner* — Adam A Arciero
(74) *Attorney, Agent, or Firm* — Baker Botts L.L.P.

(57) ABSTRACT

The invention relates to materials for use as electrodes in an alkali-ion secondary (rechargeable) battery, particularly a lithium-ion battery. The invention provides transition-metal compounds having the ordered-olivine or the rhombohedral NASICON structure and the polyanion $(PO_4)^{3-}$ as at least one constituent for use as electrode material for alkali-ion rechargeable batteries.

18 Claims, 10 Drawing Sheets

U.S. PATENT DOCUMENTS

| | | | |
|---|---|---|---|
| 4,512,905 A | 4/1985 | Clearfield et al. | 252/62.2 |
| 4,526,844 A | 7/1985 | Yoldas et al. | 429/30 |
| 4,587,172 A | 5/1986 | Roy et al. | 428/450 |
| 4,844,995 A | 7/1989 | Noda et al. | 429/189 |
| 4,925,751 A | 5/1990 | Shackle et al. | 429/191 |
| 4,959,281 A | 9/1990 | Nishi et al. | 429/194 |
| 4,980,080 A | 12/1990 | Lecerf et al. | 252/182.1 |
| 4,985,317 A | 1/1991 | Adachi et al. | 429/191 |
| 5,086,374 A | 2/1992 | MacFarlane et al. | 361/525 |
| 5,246,796 A | 9/1993 | Nagamine et al. | 429/194 |
| 5,286,582 A | 2/1994 | Tahara et al. | 429/218 |
| 5,370,948 A | 12/1994 | Hasegawa et al. | 429/223 |
| RE34,991 E | 7/1995 | Yoshino et al. | 429/194 |
| 5,488,018 A | 1/1996 | Limaye | 501/104 |
| 5,514,490 A | 5/1996 | Chen et al. | 429/191 |
| 5,538,814 A | 7/1996 | Kamauchi et al. | 429/218 |
| 5,614,334 A | 3/1997 | Kamauchi et al. | 429/217 |
| 5,683,835 A | 11/1997 | Bruce | 429/224 |
| 5,698,338 A | 12/1997 | Barker et al. | 429/223 |
| 5,705,296 A | 1/1998 | Kamauchi et al. | 429/218 |
| 5,721,070 A | 2/1998 | Shackle | 429/218 |
| 5,871,866 A | 2/1999 | Barker et al. | 429/231.1 |
| 5,910,382 A | 6/1999 | Goodenough et al. | 429/218.1 |
| 6,085,015 A | 7/2000 | Armand et al. | 385/140 |
| 6,514,640 B1 | 2/2003 | Armand et al. | 429/231.1 |
| 7,001,690 B2 | 2/2006 | Barker et al. | 429/221 |
| 2004/0072069 A1 | 4/2004 | Hong et al. | 429/221 |
| 2005/0069484 A1 | 3/2005 | Manev et al. | 423/594.15 |

FOREIGN PATENT DOCUMENTS

| | | |
|---|---|---|
| CA | 2543784 | 10/1997 |
| CA | 2200998 | 9/1998 |
| CA | 2334386 | 10/2000 |
| CA | 2395115 | 7/2001 |
| CA | 2466366 | 7/2001 |
| CA | 2483918 | 12/2003 |
| EP | 0 571 858 | 12/1993 |
| EP | 0 743 692 | 11/1996 |
| EP | 0 794 585 | 9/1997 |
| JP | 05-325961 | 12/1993 |
| JP | 6223832 | 8/1994 |
| JP | 6275277 | 9/1994 |
| JP | 6283207 | 10/1994 |
| JP | 09-134724 | 5/1997 |
| JP | 9134724 | 5/1997 |
| JP | 9134725 | 5/1997 |
| JP | 9171827 | 6/1997 |
| JP | 11025983 | 1/1999 |
| JP | 3484003 | 10/2003 |
| JP | 3504195 | 12/2003 |
| JP | 3523397 | 2/2004 |
| JP | 2004178835 | 6/2004 |
| JP | 2010-56097 | 3/2010 |
| WO | WO 95/12900 | 5/1995 |
| WO | WO 97/40541 | 10/1997 |
| WO | WO 98/12761 | 3/1998 |
| WO | WO 00/60679 | 10/2000 |
| WO | WO 01/54212 | 7/2001 |

OTHER PUBLICATIONS

A123 Systems, High-Power, Long-Life Power Tool Batteries Using Lithium-Ion Nanophosphate Cathodes, AABC Conference, Baltimore, MD. May 15-17, 2006, 1 page.

A123 Systems, Inc. Proposal dated Jan. 14, 2002, submitted to the Dept. of Energy, pp. 1, 3, 4, 9-11, 16-18.

Response to Office Action regarding Canadian Patent 2,543,784 dated Feb. 5, 2007; pp. 3.

Office Action regarding Canadian Patent 2,543,784 dated Aug. 3, 2006; pp. 5.

"Analysis Procedure of A123 Electrodes from Li ion Cells Contained in a DeWalt Hammer Drill," 2 pages.

Aono, H., "Ionic Conductivity of the Lithium Titanium Phosphate (Li1+xMxTi2−x(PO4)3, M=Al, Sc, Y, and La) Systems," J. of the Electrochemical Society, vol. 136(2), Manchester, NH, 2 pages, 1989.

Notice of Intent to Issue ExParte Reexamination Certificate for U.S. Patent 5,910,382 (VAL011588-VAL011592), Dec. 26, 2007.

Batteries Digest, High-Power Lithium-ion, Mar. 2006, 2 pages, 2006.

Ex Parte Reexamination Certificate re US Patent 5,910,382 (VAL011620-VAL011625), Apr. 15, 2008.

Bhola et al., EVS-22 White Paper, "Lithium ion SuperPolymer®-high performance Battery for Low-Cost, Ultra-Safe Long Range (300 km) ZEVs and Plug-in Hybrids," 2006, pp. 8.

Brodd, R. J., "NIST GCR 06-903, Factors Affecting U.S. Production Decisions: Why Are There No Volume Lithium-Ion Battery Manufactures in the United States?," Dec. 2006, 2 pages.

Bykov, A. B., et al., "Superionic Conductors Li3M2(PO4)3 (M=Fe, Sc, Cr): Synthesis, Structure and Electrophysical Properties," Solid State Ionics, vol. 38, April No. 1/2, Amsterdam, NL, pp. 31-52, Apr. 1990.

Supplemental Response to Office Action regarding Canadian Patent 2,543,784 dated Mar. 4, 2008; pp. 2.

Response to Office Action regarding Canadian Patent 2,543,784 dated Feb. 25, 2008; pp. 7.

Li-ion Technology Overview, NTSB Heating, Washington, D.C. Jul. 12-13, 2006, Jason Howard, Ph.D., 2 pages.

F. Sauvage et al., "Thin Film Approach for a Better Understanding of the Transport Properties of LiFePO4/FePO4," Abstract #186, 2006 IMLB conference, 1 page.

David Morrison, Power Electronics Technology, "New Electrode Materials Promise Further Gains in Li-ion Battery Capacity," Sep. 28, 2005, pp. 1-3.

Hideo Takeshita, "Worldwide Market Update on NiMH, Li ion and Polymer Batteries for Portable Applications and HEVS," The 24th International Battery Seminar & Exhibit, Pre-Seminar Tutorial II, Mar. 19, 2007, 2 pages.

U.S. Geological Survey, Average Annual Price Survey 1990-2006, 1 page.

"Batteries for Advanced Transportation Technologies (High-Energy Battery)," U.S. Department of Energy, Energy Efficiency and Renewable Energy Office of Transportation Technologies, 2001 Annual Progress Report, p. 1-2, 39-41.

A123 Systems, Inc. Proposal dated Jan. 14, 2002, submitted to the Department of Energy, p. 1, 3, 4, 9-11, 16-18.

Batteries News, Newsletter No. 1 , "The Worldwide Rechargeable Battery Market," Nov. 2004, 2 pages.

TIAX ARCT™ testing of LiFePO4, 1 page.

The Electrochemical Society 204th Meeting Symposium, Oct. 12-16, 2003, Presentation of NTT Microsystem Laboratories, 2 pages.

M. Takahashi et al., "Confirmation of Long-Term Cyclability and High Thermal Stability of LiFePO4 in Prismatic Lithium-Ion Cells," Journal of the Electrochemical Society, 152, (5), 2005, pp. A899-A904.

Energy Storage Research and Development Annual Progress, FY 2006, Jan. 2007, 2 pages.

Proposal dated Apr. 22, 2003, submitted to the Department of Energy by A123 Systems, Inc., 8 pages.

USCAR (United States Council for Automotive Research) News Release, Dec. 8, 2006, 10 pages.

Valence/Energy CS Proposal dated Sep. 18, 2006 to New York State for its PHEV Initiative Program, pp. 2.

http://www.valence.com/saphion.asp., 2 pages, Sep. 18, 2006.

The 23rd International Battery Seminar & Exhibit, Mar. 13-16, 2006, Ft. Lauderdale, FL., A123 Presentation, 3 pages.

Declaration of Yet-Ming Chiang under 37 C.F.R. § 1.132, Sep. 8, 2006.

TIAX 2003 XRD Analysis of Valence Cathode, 1 page.

J. Wolfenstine et al., "Ni3+/Ni2+ redox potential in LiNiPO4," Journal of Power Sources, 142, (2005), pp. 389-390.

J. Wolfenstine et al., "LiNiPO4-LiCoPO4 solid solutions as cathodes," Journal of Power Sources, 136, (2004), pp. 150-153.

"Advanced Lithium Iron Phosphates," Thorsten Lahrs, CEO, Phostech Lithium, Inc., Canada, Dec. 5, 2006, Lithium Mobile Power 2006 Conference, Miami, Florida, 18 pages.

Bridget Deveney et al., "Large Size Lithium Ion Cells Based on LiFePO4 Cathode Material," 11 pages.

New York State Plug-in Hybrid Electric Vehicle (PHEV) Technology Initiative Program Opportunity Notice No. 1088, 1 page, Sep. 18, 2006.

New York State Plug-in Hybrid Electric Vehicle (PHEV) Technology Initiative Program Opportunity Notice No. 1088, A123 and Hymotion's PON No. 1088 Proposal Checklist and Executive Summary, Sep. 18, 2006, p. 1, 4, 9, 12-13.

New York State Plug-in Hybrid Electric Vehicle (PHEV) Technology Initiative Program Opportunity Notice No. 1088, A123 and Hymotion's PON No. 1088 Proposal Checklist, "About A123 Systems battery technology," Sep. 18, 2006, p. 7 & 13.

EVS-22 White Paper, R. Bhola et al., Lithium Ion SuperPolymer®-high performance Battery for low-cost, ultra-safe, long range (300km) ZEVs and Plug-in Hybrids, 2006, 8 pages.

New York State Plug-in Hybrid Electric Vehicle (PHEV) Technology Initiative Program Opportunity Notice No. 1088, Hybrids Plus, Inc. PON No. 1088 Proposal Checklist, Sep. 16, 2006, 2 pages.

"Crystal Structure of Olivine (MIM2)X04", 1 page, 2000.

"LiCoPO4, 900C, air, 24h", 3 pages.

"Analysis Procedure of A123 Electrodes from Li-ion Cells contained in a DeWalt Hammer Drill", 2 pages.

"XRD, LeBail and Rietveld Test Results: Sample: A123 Cell at 50% State of Charge as received", 3 pages.

"Rietveld Results: Structure, Sample: A123 Cell at 50% State of Charge as received," 1 page.

"XRD, LeBail and Rietveld Test Results: Sample: A123 Cell Discharged to 95%", 3 pages.

"Rietveld Results: Structure, Sample: A123 Cell at 95% State of Charge as received," 1 page.

"Elemental Analysis (ICP), Sample: A123 Cell at 50% State of Charge as received," 1 page.

"TEM: Morphology, Composition, Sample: A123 Cell at 50% State of Charge as received," 6 pages.

"SEM: Morphology, Composition, Sample: A123 Cell at 50% State of Charge as received," 3 pages.

"Electrochemical Testing, Sample: A123 Cell Discharged to 95%," 1 page.

Yanning Song et al., "New Iron(III) Phosphate Phases: Crystal Structure and Electrochemical and Magnetic Properties," Inorganic Chemistry, vol. 41, No. 22, 2002, pp. 5778-5786.

Shoufeng Yang et al., "Reactivity, stability and electrochemical behavior of lithium iron phosphates," Electrochemistry Communications 4 (2002), pp. 239-244.

Yanning Song et al., "Temperature-dependent properties of FePO4 cathode materials," Materials Research Bulletin 37 (2002), pp. 1249-1257.

Allen Chen, "Batteries of the Future II, Building Better Batteries Through Advanced Diagnostics," Science@Berkeley Lab, Feb. 2007.

Results of XRD patterns tests, 4 pages.

A 123/Hymotion Proposal for Civic PHEV prototype dated Sep. 18, 2006, to New York State for its PHEV Initiative Program ("A1213 Civic Proposal"), p. 9, 12 & 13.

A 123/Hymotion Proposal for Prius PHEV prototype dated Sep. 18, 2006, to New York State for its PHEV Initiative Program ("A1213 Prius Proposal"), p. 10, 13 & 14.

Valence Technologies, Inc., Form 10-K filed Jun. 14, 2007, 2 pages.

Atsuo Yamada et al., "Reaction Mechanism of the Olivine-Type $Li_x(Mn_{0.6}Fe_{0.4})PO_4$ (0<x<1)," Journal of the Electrochemical Society, 148 (7), pp. A747-A754, (2001).

Zu-Xiang Lin et al., "Lithium Ian Conductors Based on $LiTi_2P_3O_{12}$ Compound," Solid State Ionics 31 Nov. 1988, No. 2, Amsterdam, NL, pp. 91-94.

M.A. Subramanian et al., "Lithium Ion Conductors in the System $AB(1 V)_2(PO_4)_3$ (B=Ti, Zr and Hf)," Solid State Ionics, vol. 18-19 (1986), Amsterdam, NL, pp. 562-569.

"Olivine," http://www.brocku.ca/earthsciences/people/gfinn/minerals/olivine.htm; pp. 2, Dec. 2, 2001.

Hiromichi Aono et al., "Ionic Conductivity of the Lithium Titanium Phosphate ($Li1+xM_xTi_{2-x}(PO_4)_3$, M=Al, Sc, Y, and La) Systems," Journal of the Electrochemical Society, vol. 136 Feb. 1989, No. 2, Manchester, NH, 2 pages.

A. K. Padhi et al., "LiFePO4: A Novel Cathode Material for Rechargeable Lithium Batteries," The Electrochemical Society, Inc., Meeting Abstracts vol. 96-1, Spring Meeting, Los Angeles, California, May 5-10, 1996, 2 pages.

A.B. Bykov et al., "Superionic Conductors $Li_3M_2(PO_4)_3$ (M=Fe, Sc, Cr): Synthesis, Structure and Electrophysical Properties," Solid State Ionics, vol. 38, Apr. 1990, No. 1/2, Amsterdam, NL, pp. 31-52.

F. D'Yvoire et al., "Phase Transitions and Ionic Conduction in 3D Skeleton Phosphates," Solid State Ionics, vol. 9-10, 1983, pp. 851-858.

Paquen-Ledent et al., "Vibrational Studies of Olivine-Type Compounds," Spectrochem. Acta, Part A, 1974, 30A (3), pp. 673-689.

Michael Thackeray, "Lithium-Ion Batteries, An Unexpected Conductor," Nature Materials, Oct. 2003, 2 pages.

Sung-Yoon Chung et al., "Electronically Conductive Phospho-Olivines as Lithium Storage Electrodes," Nature Materials, Oct. 2002, pp. 123-128.

Pier Paolo Prosini et al., "Long-term Cyclability of Nanostructured LiFePO4," Electrochemical Acta 48, (2003), pp. 4205-4211, 2003.

Christian Masquelier et al., "Hydrated iron Phosphates FePO4•nH2O and $Fe_4(P_2O_7)_3$ nH2O as 3V Positive Electrodes in Rechargeable Lithium Batteries," Journal of the Electrochemical Society, 149 (8) pp. A1037-A1044, (2002).

K. Amine et al., "Olivine LiCoPO4 AS 4.8 V Electrode Material for Lithium Batteries," Electrochemical and Solid-State Letters, 3 (4), 2000, pp. 178-179. 2000.

Shigeto Okada et al., "Cathode properties of phospho-olivine LiMPO4 for lithium secondary batteries," Journal of Power Sources 97-98, 2001, pp. 430-432.

P. Deniard et al., "High potential positive materials for lithium-ion batteries: transition metal phosphates," Journal of Physics and Chemistry of Solids 65, 2004, pp. 229-233.

"Selected Powder Diffraction Data for Minerals," Data Book, First Edition, Joint Committee on Powder Diffraction Standards, 1974, 9 pages.

"Mineral Powder Diffraction File Databook," Sets 1-42, International Centre for Diffraction Data, 1993, 13 pages.

"Power Diffraction File," Sets 31 to 32, International Centre for Diffraction Data, 1988, 7 pages.

T. G. Fawcett et al., "Developments in formulation analyses by powder diffraction analysis," Powder Diffraction 21 (2), Jun. 2006, pp. 105-110.

T. A. Hewston et al., "A Survey of First-Row Ternary Oxides LiMO2 (M=Sc—Cu)," J. Phys. Chem. Solids, vol. 48, No. 2, 1987, pp. 97-108.

Erich Thilo, "About the Isomorphs of Phosphates with the Generic Composition MeLi[PO4] and the Silicates of the Olivine-Monticellite Series," Die Naturwissenschaften, Springer Verlag Berlin, Issue 16, Apr. 18, 1941, pp. 239.

Andre-Mathieu Fransolet et al., "An X-ray determinative method for the divalent cation ratio in the triphylite-lithiophilite series," Mineralogical Magazine, Sep. 1984, vol. 48, pp. 378-381.

Ernest M. Levin et al., "Metal-Oxygen Systems, Including Those Containing Valence Changes," Phase Diagrams for Ceramists, The American Ceramic Society, 1964, 4 pages.

A. Z. Hed et al., "Contribution to the Mn-O Phase Diagram at High Temperature," J. Electrochem. Soc.: Electrochemical Science, Apr. 1967, pp. 314-318.

H. Kobayashi et al., "Structure and lithium deintercalation of $Li_{2-x}RuO_3$." Solid State Ionics 82 (1995), pp. 25-31.

Per Kofstad, "Nonstoichiometry, Diffusion, and Electrical Conductivity in Binary Metal Oxides," 1983, 54 pages.

W.J. Macklin et al., "Performance of titanium dioxide-based cathodes in a lithium polymer electrolyte cell," Solid State Ionics 53-56 (1992), pp. 694-700.

Arnulf Muan, "Phase Equilibria at High Temperatures in Iron Silicate Systems," Ceramic Bulletin, vol. 37, No. 2(1958), pp. 81-84.

A.K. Padhi, et al., "Ambient and High-Pressure Structures of $LiMnVO_4$ and Its $Mn^{3+}/Mn^{2+}$ Redox Energy," Journal of Solid State Chemistry 128:, pp. 267-272 (1997) Article No. SC967217. No Month.

Chemical Abstracts Accession No. 81:70663 CA Abstract of "Vibrational studies of olivine-type compounds" Spectrochem. Acta, Part A(1974), 30A(3) 673-89. (No month available).
Delmas and Nadiri, "The chemical short circuit method. An improvement in the intercalation-deintercalation techniques," Mater. Res. Bull., 23, pp. 65-72, 1988.
Goodenough et al., "Fast Na+-ion transport in skeleton structures," Mater. Res. Bull. 11, pp. 203-220, 1976.
Guyomard and Tarascon, "Li metal-free rechargeable LiMn2 O4 /carbon cells: Their understanding and optimization," J. Electrochem. Soc., 139, pp. 937-948, 1992.
Long et al., "A study of anhydrous iron(111) sulfate by magnetic susceptibility Mossbauer, and neutron diffraction techniques," Inorg. Chem., 18, pp. 624-632, 1979.
Manthiram and Goodenough, "Lithium insertion into Fe2 (SO4) frameworks," J. Power Sources, 26, pp. 403-408, 1989.
Masquelier et al., "Chemical and magnetic characterization of spinel materials in the LiMn2 04-Li2 MN2 09-Li4 Mn5 012 system," J. Solid State Chem., 123, pp. 225-266, 1996.
Mizushima et al., "Lix CoO2 (0<x<): A new cathode material for batteries or high energy density," Mater. Res. Bull., 15, pp. 783-789, 1980.
Nanjundaswamy et al., "Synthesis, redox potential evaluation and electrochemical characteristics of NASICON-related-3D framework compounds," Solid State Ionics, 92, pp. 1-10, 1996.
Okada et al., "Fe2 (SO4)3 as cathode material for rechargeable lithium batteries," Proc. 36th Power Sources Conf., Cherry Hill, New Jersey, Jun. 6-9, 1994.
Schollhorn and Payer, "c-TiS2, a new modification of titanium disulfide with cubic structure," Agnew. Chem. (Int. Ed. Engl.), 24, pp. 67-68, 1985.
Sinha and Murphy, "Lithium intercalation in cubic TiS2," Solid State Ionics, 20, pp. 81-84, 1986.
Thomas et al., "Synthesis an structural characterization of the normal spinel Li[Ni2 ]04," Mater. Res. Bull., 20, pp. 1137-1146, 1985.
Thackeray et al., "Electrochemical extraction of lithium from LiMn2O4," Mater. Res. Bull., 19, pp. 179-187, 1984.
Thackeray et al., "Lithium insertion into manganese spinels," Mater. Res. Bull. 18, pp. 461-472, 1983.
Wang and Hwu, "A new series of mixed-valence titanium (III/IV) phosphates, Li1+x Ti2 (PO4)3 (0<x<2) with NASICON-related structures," Chem. of Mater. 4, pp. 589-595, 1992.
Petit et al., CA, 115:238022, Abstract only, 1991.
Masquelier et al., "New Cathode materials for rechargeable lithium batteries: the 3-D framework structures Li3 Fe2 (XO4)3 (X=P, As)," J. of Solid State Chemistry, 135, pp. 228-234, 1998.
Padhi et al., "Effect of structure on the Fe3+/Fe2+ redox couple in iron phosphates," J. or the Electrochem. Society, 144, pp. 1609-1613, 1997.
Padhi et al., "Mapping of transition metal redox energies in phosphates with NASICON structure by lithium intercalation," J. Electrochem. Soc., 144, pp. 2581-2586, 1997.
Padhi et al., "Phospho-olivines as positive-electrode materials for rechargeable lithium batteries," J. Electrochem. Soc., 144, pp. 1188-1194, 1997.
Padhi et al., "Tuning the position of the redox couples in materials with NASICON structure by anionic substitution," J. Electrochem. Soc., 145, pp. 1518-1520, 1998.
I. Abrahams et al., "Structure of Lithium Nickel Phosphate," Acta Cryst. C49, pp. 925-926, (1993).
F. Kubel, "Crystal Structure of Lithium Cobalt Double Orthophosphate, LiCoPO4," Zeitschrift fur Kristallographie, 209, pp. 755, (1994).
S.A. Warda et al., "Refinement of the Crystal Structure of Lithium Nickel Phosphate, LiNiPO4," Zeitschrift fur Kristallographie, New Crystal Structures 212, pp. 319, (1997).
L. W. Finger et al., "Refinement of the Crystal Structure of Triphylite," Year Book-Carnegie Institution of Washington. Carnegie Institution of Washington, Washington, D.C., 1970, pp. 290-292.
Gareyte, C.R. Acad. Sc. Paris, t. 264, pp. 979-982 (1967).
S. Geller et al, "Refinement of the Structure of LiMnPO4," Acta Cryst, 13, pp. 325-331, (1960).

R. P. Santoro et al., "Antiferromagnetism in LiFePO4," Acta. Cryst. 22, pp. 344-347, (1967).
R. P. Santoro et al., "Magnetic Properties of LiCoPO4 and LiNiPO4," J. Phys. Chem. Solids, vol. 27, pp. 1192-1193, (1966).
O. V. Yakubovich et al., "The Crystal Structure of a Synthetic Triphylite LiFe [PO4]," Sov. Phys. Dokl. 22(7), pp. 347-348, Jul. 1977.
Victor A. Streltsov et al., "Multiple Analysis of the Electron Density in Triphylite, LiFePO4, Using X-ray Diffraction Data," Acta Cryst. B49, pp. 147-153, (1993).
C. Delacourt et al., "Toward Understanding of Electrical Limitations (Electronic, Ionic) in LiMPO4 (M=Fe, Mn) Electrode Materials," Journal of the Electrochemical Society, 152 (5), pp. A913-A921, (2005).
W. C. West et al., "Radio Frequency Magnetron-Sputtered LiCoPO4 Cathodes for 4.8V Thin-Film Batteries," Journal of the Electrochemical Society, 150 (12), pp. A1660-A1666 (2003).
H. Huang et al., "Approaching Theoretical Capacity of LiFePO4 at Room Temperature at High Rates," Electrochemical and Solid-State Letters, 4 (10), pp. A170-A172, (2001).
J. M. Tarascon et al., "Issues and Challenges Facing Rechargeable Lithium Batteries," Nature, vol. 414, pp. 359-367, Nov. 15, 2001.
J. Gaubicher et al., "Li/•-VOPO4: A New 4V System for Lithium Batteries," Journal of the Electrochemical Society, 146 (12), pp. 4375-4379 (1999).
Lloris et al.; "Improvement of the Electromechanical Performance of LiCoPO4 5 V Material Using Novel Synthesis Approach"; Electromechanical and Solid-State Letters, 5 (10); pp. 234-237, Jun. 24, 2005.
Yet-Ming Chiang et al., "Physical Ceramics: Principles for Ceramic Science and Engineering," J. Wiley and Sons, New York, 1997, pp. 236-245.
Jessica Gorman, "Bigger, Cheaper, Safer Batteries: New Material Charges Up Lithium-ion Battery Work," Science News Online, Week of Sep. 28, 2002, vol. 162, No. 13, pp. 196.
Valence Technology Receives Patent for Phosphate Lithium-ion Battery Technology; Press Release; Austin, Texas; Feb. 21, 2006.
Examination Report, European Patent Application No. 97 923 437.4, Mar. 26, 2003, 4 Pgs.
Examination Report, European Patent Application No. 97 923 437.4, Nov. 15, 2001, 5 Pgs.
Examination Report, European Patent Application No. 97 923 437.4, Nov. 21, 2003, 3 Pgs.
Faber et al.; "The Powder Diffraction File: Present and Future," Acta Cryst. B58:325-332, 2002, Jun. 24, 2005.
Letter from Requester to D.E. Venglarik dated Jun. 12, 2007.
Letter from Requester to D.E. Venglarik dated Aug. 2, 2007.
Letter from Requester to D.E. Venglarik and E.A. Figg dated Nov. 6, 2007.
Notice of Opposition to a European Patent, European Patent No. 0 904 607, 29 pages, Oct. 27, 2004.
Patent Proprietor's Response to Notice of Opposition, European Pat. No. 0 904 607, May 12, 2006, 79 pages.
Plaintiff Hydro-Quebec's Preliminary Proposed Construction of the Claim Terms to be Construed, Dec. 21, 2006, 7 pages.
Plaintiff Hydro-Quebec's Response in Opposition to the Motion for Summary Judgment of Defendant Valence Technology, Inc., Jul. 3, 2006, 148 pages.
Reply to Patent Proprietor's Response to Notice of Opposition, European Patent No. 0 904 607, Jan. 24, 2007, 95 pages.
Office Action regarding Canadian Patent 2,543,784 dated Aug. 24, 2007; pp. 2.
Section 34.1(1) Submission regarding Canadian Patent 2,543,784 dated Oct. 27, 2007; pp. 3.
Supplemental European Search Report, European Patent Application No. 97 92 3437, Dec. 23, 1999, 5 pages.
Response to Office Action regarding Canadian Patent 2,543,784 dated May 27, 2009; pp. 5.
Thomson, "New MIT Material could impact Rechargeable batteries"; http://web.mit.edu/newsoffice/2002/battery, 2002, Jun. 24, 2005.
Office Action Regarding Canadian patent 2,543,784 dated Nov. 27, 2008; pp. 2.

Notice of Allowance regarding Canadian Patent 2,251,709 dated Nov. 14, 2005; pp. 1.
Office Action Regarding Canadian Patent 2,251,709 dated Sep. 13, 2004; pp. 4.
Response to Office Action regarding Canadian Patent 2,251,709 dated Mar. 14, 2005; pp. 12.
Fey et al.; "LiNiVO4: A 4.8 Volt Electrode Material for Lithium Cells"; J. Electrochem. Soc., vol. 141, No. 9; pp. 2279-2282, Jun. 16, 2005.
Request for ExParte Reexamination with Transmittal and Appendices for U.S. Patent 6,514,640 (VAL003111-VAL003168), Sep. 8, 2006.
Substitute Request for Reexamination, Reply to Notice of Failure to Comply and Certificate, and Appendix of Service for U.S. Patent 6,514,640 (VAL003466-VAL003557), Oct. 23, 2006.
Substitute Request for Reexamination, Reply to Notice of Failure to Comply and Certificate, and Appendix of Service for U.S. Patent 6,514,640 (VAL003575-VAL003651), Nov. 9, 2006.
USPTO Litigation Search Report for U.S. Patent 6,514,640 (VAL003681-VAL003703), Dec. 21, 2006.
Order Grant Request for ExParte Reexamination for U.S. Patent 6,514,640 (VAL003704-VAL003722), Jan. 25, 2007.
Office Action for U.S. Patent 6,514,640 (VAL003751-VAL003763), Aug. 9, 2007.
Statement of Issue to be Discussed and Proposed Claims for U.S. Patent 6,514,640 (VAL003772-VAL003782), Aug. 30, 2007.
Declaration of Lin Hughes in Support of Valence's Motion for Rule 11 Sanctions Against Hydro-Quebec and Exhibits for U.S. Patent 6,514,640 (VAL004899-VAL005007), May 9, 2006.
Valence Technology Inc.'s Motion for Summary Judgment of Invalidity and Non-Infringement with Declaration of Lin Hghes and Exhibits for U.S. Patent 6,514,640 (VAL0047251-VAL004746), Jun. 19, 2006.
Plaintiff Hydro-Quebec's response in opposition to the motion for summary judgment of Valence for U.S. Patent 6,514,640 (VAL004747-VAL004760), Jul. 3, 2006.
Valence Technology's Reply in Support of Motion for Summary Judgment of Invalidity and non-infringement for U.S. Patent 6,514,640 (VAL004761-VAL004766), Jul. 14, 2006.
Plaintiff Hydro-Quebec's Preliminary Proposed Construction of the Claim Terms to be Construed for U.S. Patent 6,514,640 (VAL004157-VAL004163), Dec. 21, 2006.
Valence's Preliminary Proposed Claim Constructions for U.S. Patent 6,514,640 (VAL004164-VAL004171), Dec. 21, 2006.
Petition for Extension of Time Under C.F.R. § 1.550(c) for U.S. Patent 6,514,640 (VAL005329-VAL005335), Sep. 6, 2007.
ExParte Reexamination Interview Summary for U.S. Patent 6,514,640 (VAL004549-VAL004550), Sep. 7, 2007.
Amendment and Response to Office Action for U.S. Patent 6,514,640 (VAL005336-VAL005367), Sep. 10, 2007.
Inventor Declaration Under 37 C.F.R. § 1.131 for U.S. Patent 6,514,640 (VAL005710-VAL005770), Oct. 9, 2007.
Final Office Action for U.S. Patent 6,514,640 (VAL006273-VAL006288), Oct. 17, 2008.
Amendment and Response to Office Action for U.S. Patent 6,514,640 (VAL006303-VAL006312), Nov. 17, 2008.
Litigation Search Report for U.S. Patent 6,514,640 (VAL006313-VAL006358), Nov. 25, 2008.
Notice of Appeal for U.S. Patent 6,514,640 (VAL006359-VAL006363), Dec. 17, 2008.
Notice of Intent to Issue ExParte Reexamination Certificate for U.S. Patent 6,514,640 (VAL006394-VAL006397), Dec. 22, 2008.
ExParte Reexamination Certificate for U.S. Patent 6,514,640 (VAL006273-VAL006288), May 12, 2009.
Request for ExParte Reexamination Pursuant to 35 U.S.C. § and 37 C.F.R> § 1.510 and Appendix for U.S. Patent 5,910,382 (VAL006423-VAL006461), Sep. 8, 2006.
Notice of Reexamination Request Filing Date/Notice of Assignment of Reexamination Request for U.S. Patent 5,910,382 (VAL006801-VAL006804), Oct. 11, 2006.
Litigation Search Report CRU 39n for U.S. Patent 5,910,382 (VAL006805-VAL006869), Oct. 19, 2006.
Order Granting/Denying Request for Ex Parte Reexamination for U.S. Patent 5,910,382 (VAL006872-VAL006894), Oct. 26, 2006.
Petition Under 37 C.F.R. § 1.181 for U.S. Patent 5,910,382 (VAL006895-VAL006900), Dec. 26, 2006.
Decision Under 37 C.F.R. § 1.181 for U.S. Patent 5,910,382 (VAL006913-VAL006915), Mar. 8, 2007.
Office Action in Ex Parte Reexamination for U.S. Patent 5,910,382 (VAL006928-VAL006941), Mar. 30, 2007.
Facsimile transmitting Statement of Issue to be Discussed in interview and Proposed Claims for U.S. Patent 5,910,382 (VAL006942-VAL006953), Apr. 25, 2007.
Ex Parte Reexamination Interview Summary for U.S. Patent 5,910,382 (VAL006966-VAL006970), Apr. 30, 2007.
Amendment and Response to Office Action for U.S. Patent 5,910,382 (VAL007860-VAL007865), Apr. 30, 2007.
Supplemental Response to Office Action, Transmittal and Interview Summary for U.S. Patent 5,910,382 (VAL009435-VAL009441), May 30, 2007.
USPTO Office Action-Final for U.S. Patent 5,910,382 (VAL010099-VAL010135), Aug. 13, 2007.
Statements of Issues to Be Discussed in Interview and Proposed Claims for U.S. Patent 5,910,382 (VAL010136-VAL010145), Aug. 30, 2007.
Ex Parte Interview Summary for U.S. Patent 5,910,382 (VAL010404-VAL010407), Sep. 10, 2007.
Amendment and Response to Final Office Action for U.S. Patent 5,910,382 (VAL010450-VAL010504), Sep. 13, 2007.
ExParte Reexamination Advisory Action (Before the Filing of an Appeal Brief) for U.S. Patent 5,910,382 (VAL010932-VAL010935), Sep. 28, 2007.
Supplemental ExParte Reexamination Advisory Action (Before the Filing of an Appeal Brief) for U.S. Patent 5,910,382 (VAL010942-VAL010944), Oct. 3, 2007.
Combined Inventor Declaration Under 37 C.F.R. § 1.131 & § 1.132 and supporting exhibits for U.S. Patent 5,910,382 (VAL011120-VAL011123), Oct. 15, 2007.
ExParte Reexamination Advisory Action (Before the Filing of an Appeal Brief) for U.S. Patent 5,910,382 (VAL011410-VAL011414), Oct. 19, 2007.
Statement of Issue to be Discussed and Proposed Claims for U.S. Patent 5,910,382 (VAL011415-VAL011420), Oct. 24, 2007.
Litigation Search Report for U.S. Patent 5,910,382 (VAL011423-VAL011500), Nov. 1, 2007.
ExParte Reexamination Interview Summary for U.S. Patent 5,910,382 (VAL011501-VAL011504), Oct. 30, 2007.
Summary of Examiner Interview for U.S. Patent 5,910,382 (VAL011509-VAL011511), Nov. 2, 2007.
Second Response to Final Office Action for U.S. Patent 5,910,382 (VAL011505-VAL011505), Nov. 2, 2007.
Letter from Reexamination Requestor (A1'23) for U.S. Patent 5,910,382 (VAL011536-VAL011538), Nov. 6, 2007.
Letter from Reexamination Requestor (A123) for U.S. Patent 5,910,382 (VAL011539-VAL011545), Aug. 1, 2007.
Letter from Reexamination Requestor (A123) for U.S. Patent 5,910,382 (VAL011546-VAL011557), Jun. 12, 2007.
ExParte Reexamination Advisory Action (Before the Filing of an Appeal Brief) for U.S. Patent 5,910,382 (VAL011564-VAL011567), Nov. 9, 2007.
Notice of Appeal for U.S. Patent 5,910,382 (VAL011582-VAL011582), Nov. 13, 2007.
Summary of Examiner's Interview for U.S. Patent 6,514,640 (VAL005701-VAL005705), Sep. 10, 2007.
Divisional of European Patent 1755182; "Cathode Materials for Secondary (Rechargeable) Lithium Batteries"; Sep. 28, 2006; pp. 45.
European Search Report; Application No. EP 06020470; pp. 6, Dec. 22, 2006.
Communication pursuant to Article 96(2) EPC; Application No. EP 06020470; pp. 1, Sep. 17, 2007.
Response to Communication pursuant to Article 96(2) EPC; Application No. EP 06020470; pp. 4, Mar. 27, 2008.
Divisional of European Patent 1501137; "Cathode Materials for Secondary (Rechargeable) Lithium Batteries"; Sep. 21, 2004; pp. 28.

European Search Report; Application No. EP 04022447; pp. 6, May 23, 2006.
Corrected European Search Report; Application No. 04022447; pp. 7, Jun. 28, 2006.
European Search Report; Application No. EP 04022447; pp. 7, Sep. 18, 2006.
Communication pursuant to Article 96(2) EPC; Application No. EP 04022447 pp. 4, Feb. 19, 2009.
Response to Communication pursuant to Article 96(2) EPC; Application No. EP 04022447 pp. 3, Sep. 1, 2009.
Communication pursuant to Article 96(2) EPC; Application No. EP 04022447 pp. 4, Oct. 5, 2009.
Divisional of European Patent 1755183 "Cathode Materials for Secondary (Rechargeable) Lithium Batteries"; Oct. 6, 2006; pp. 51, Oct. 6, 2006.
European Search Report; Application No. EP 06021083 pp. 6, Jan. 22, 2007.
Communication pursuant to Article 96(2) EPC; Application No. EP 06021083 pp. 1, Mar. 10, 2008.
Response to Communication pursuant to Article 96(2) EPC; Application No. EP 06021083 pp. 4, Sep. 22, 2008.
Deb et al.; "In situ X-ray absorption spectrosgopy—Aprobe of cathode materials for Li-ion cells"; Fluid Phase Equilibria, 241; pp. 4-19, Jun. 28, 2005.
Valence's Disclosure of Expert Opinions of Dr. Elton J. Cairnes; Civil Action No. A06CA111 SS; pp. 57, Jul. 13, 2009.
List of Dr. Elton J. Cairnes Publications; pp. 6.
Tucker et al.; "7Li and 31P Magic Angle Spinning Nuclear Magnetic Resonance of LiFePO4-Type Materials"; Electrochemical and Solid-State Letters, 5 (5); pp. A95-A98, Jun. 24, 2005.
Tucker et al.; "Hyperfine Fields at the Li Site in LiFePO4-Type Olivine Materials for Lithium Rechargeable Batteries: A 7Li MAS NMR and SQUID Study"; J. Am. CHem. Soc., 124, pp. 3832-3833, Jun. 24, 2005.
Deb et al.; "Structural Investigations of LiFePO4 Electrodes by Fe X-ray Absorption Spectroscopy"; J. Phys. Chem. B, 108; pp. 7046-7051, Jun. 26, 2005.
Deb et al.; "X-ray absorption Spectroscopy study of the Li x FePO4 cathode during cycling using a novel electrochemical in situ reaction cell"; J. Synchrotron Rad., 11; pp. 497-504, Jun. 26, 2005.
Haas et al.; "Synchrotron X-ray Absorption Study of LiFePO4 Electrodes"; Journal of The Electrochemical Society, 152 (1); pp. A191-A196, Jun. 27, 2005.
Deb et al.; "Structural Investigations of LiFePO4 Electrodes by Fe X-ray Absorption Spectroscopy"; Electrochimica Acta 50; pp. 5200-5207, Jun. 27, 2005.
Kimura et al.; "The pseudo-single-crystal method: a third approach to crystal structure determination"; Journal of Applied Crystallography, 42; pp. 3, Jul. 1, 2005.
Shusaku Yamamoto; Response to Invalidation Appeal Nos. 2008-800031 against Japanese patent No. 3484003, and Invalidation Appeal No. 2008-800032 against Japanese Patent No. 3523397; pp. 10, Jun. 30, 2005.
Shusaku Yamamoto; Invalidation Appeal No. 2008-800031 against Japanese patent No. 3484003, and Invalidation Appeal No. 2008-800032 against Japanese Patent No. 3523397; pp. 9, Jun. 30, 2005.
Shusaku Yamamoto; Invalidation Appeal No. 2008-800032 against Japanese Patent No. 3523397 Summary Table; pp. 10, Jun. 30, 2005.
John B. Goodenough; "Design Considerations"; Solid State Ionics, 69; pp. 15, Jun. 16, 2005.
Wang et al.; "Continuous solid solutions LiFe1-xCOxPO4 and its electrochemical performance"; Journal of Power Sources, 146; pp. 580-583, Jun. 27, 2005.
Extrait de notre chapitre dans l'*Encyclopedia of Electrochemical Power Source*; p. 1.
Zaghib et al.; "LiFePO4: From Material Science to Application as a Positive Electrode for Li-Ion Batteries"; ECPS00204; pp. 33, Jul. 1, 2005.
Figures; "Zig-zag chains of the MO6 octahedra"; pp. 4.
George E. Blomgren; "Making a potential difference"; Nature, vol. 42; pp. 680-681; www.nature.com, Oct. 12, 2000.
Axmann et al.; "Nonstoichiometric LiFePO: Defects and Related Properties"; Chem. Mater., 21(8); pp. 1636-1644, Jul. 1, 2005.
Roberts et al.; "High-throughput studies of Li1-xMgx/2FePO4 and LiFe1-yMgyPO4 and the effect of carbon coating"; Journal of Power Sources, 179; pp. 754-762, Jun. 30, 2005.
Kathryn A. Striebel; "Analysis of the Valence Technology N-Charge Back-Up Computer Battery"; Jul. 2003, last update Feb. 16, 2010.
Zaghib et al.; Caractérisation sommaire de la cathode d'une pile Saphion aS1p de Valence Rapport préliminaire; Hydro-Quebec; Laboratoire de caractérisation; pp. 6, Jul. 23, 2007.
M. Yazid Saïdi; "Lithium Metal Phosphates: Next Generation Materials for Li-Ion Batteries"; Valence Technologies, Inc.; pp. 36.
Thorat et al.; "Quantifying tortuosity in porous Li-ion battery materials"; Journal of Power Sources, 188; pp. 592-600, 2009.
Salah et al.; "Reduction Fe3+ of Impurities in LiFePO4 from Pryolysis of Organic Precursor Used for Carbon Deposition"; Journal of the Electrochemical Society, 153(9); pp. A1692-A1701, 2006.
Gueri et al.; "LiFePO4 and graphite electrodes with ionic liquids based on bis(fluorosulfonyl)imide (FSI)- for Li-ion batteries"; Journal of Power Sources, 175; pp. 866-873 2008.
Striebel et al.; "LiFePO4/gel/natural graphite cells for the BATT program"; Journal of Power Sources, 119-121; pp. 951-954, 2003.
Wang et al.; "Extraction of Layerwise Conductivities in Carbon-Enhanced, Multilayered LiFePO4 Cathodes"; Journal of the Electrochemical Society, 152(5); pp. A1001-A1010, 2005.
Yoon et al.; "Electronic Structure of the Electrochemically Delithiated Li1-xFePO4 Electrodes Investigated by P K-edge X-Ray Absorption Spectroscopy"; Electrochemical and Solid-State Letters, 9(9); pp. A415-A417, 2006.
Zaghib et al.; "Aging of LiFePO4 upon exposure to H2O"; Journal of Power Sources, 185; pp. 698-710, 2008.
Letters to the Editor; "Unsupported claims of ultrafast charging of LiFePO4 Li-ion batteries"; Journal of Power Sources, 194; pp. 1021-1023, 2009.
Zaghib et al.; "Electronic, Optical, and Magnetic Properties of LiFePO4: Small magnetic Polaron Effects"; Chem. Mater., 19; pp. 3740-3747, 2007.
Whitacre et al.; "Dual active material composite cathode structures for Li-ion batteries"; Journal of Power Sources, 177; pp. 528-536, 2008.
Guerfi et al.; "Improved Electrolytes fro Li-ion batteries: Mixtures of ionic liquid and organic electrolyte with enhanced safety and electrochemical performance"; Journal of Power Sources, 195; pp. 845-852, 2010.
Guerfi et al.; "LiFePO4 water-soluble binder electrode for Li-ion batteries"; Journal of Power Sources, 163; pp. 1047-1052, 2007.
Zaghib et al.; "Optimized electrochemical performance of LiFePO4 at 60°C with purity controlled by SQUID magnetometry"; Journal of Power Sources, 163; pp. 560-566, 2006.
Papike et al.; "Crystal Chemistry of Silicate Minerals of Geophysical Interest"; Reviews of Geophysics and Space Physics, vol. 14, No. 1; pp. 44, 1976.
Hanic et al.; "Crystal Structure of Lithium Magnesium Phosphate, LiMgPO4: Crystal Chemistry of the olivine-Type Compounds"; Journal of Crystallographic and Spectroscopic Research, vol. 12, No. 2; pp. 29, 1982.
Dorris et al.; "Atomic Packing Models of Some Common Silicate Structures"; The American Mineralogist Journal of the Mineralogical Society of America, vol. 23, No. 2; pp. 20, 1938.
Quensel; "Minerals of the Varuträsk Pegmatite"; Geol. Fören. Förhandl., Bd. 59, H. 1; pp. 20, 1937.
Alberti; "The Crystal Structure of ferrisicklerite, Li<1(Fe3+, Mn2+)PO4"; Acta. Cryst., B32; pp. 4, 1976.
Mercier et al.; "Une Nouvelle Famille de corps magnetoelectriques: LiMPO4 (M=Mn, Co, Ni)"; C.R> Acad. Sc. Paris, t. 264; pp. 4, 1967.
Whittingham; "Electrical Energy Storage and Intercalation Chemistry"; www.sciencemag.org; pp. 2, 2009.
Wilmer Hale "Claim Chart regarding Kamauchi 814 Patent"; pp. 7.
Wilmer Hale "Claim Chart regarding Kamauchi 334 Patent"; pp. 6.
Wilmer Hale "Claim Chart regarding Kamauchi 858 Patent"; pp. 8.
Wilmer Hale "Updated Claim Chart regarding Kamauchi 814 Patent", Oct. 23, 2006; pp. 8.
Wilmer Hale "Updated Claim Chart regarding Kamauchi 334 Patent", Oct. 23, 2006; pp. 6.

Wilmer Hale "Updated Claim Chart regarding Kamauchi 858 Patent", Oct. 23, 2006; pp. 9.
Wilmer Hale "Updated Claim Chart regarding Kamauchi 814 Patent", Nov. 9, 2006; pp. 9.
Wilmer Hale "Updated Claim Chart regarding Kamauchi 334 Patent", Nov. 9, 2006; pp. 8.
Wilmer Hale "Updated Claim Chart regarding Kamauchi 858 Patent", Nov. 9, 2006; pp. 10.
Table 1 of U.S. Patent 5,614,334 regarding Request for Reexamination; pp. 7.
Table 2 of EP Patent 0 571 858 regarding Request for Reexamination; pp. 6.
Table 3 of U.S. Patent 5,538,814 regarding Request for Reexamination; pp. 5.
Table 4 of JP Patent 06-283207 regarding Request for Reexamination; pp. 1.
Letter from HQ notifying A123 and Black & Decker about A123's Infringing Batteries; pp. 1, Nov. 14, 2005.
Complaint and Jury Demand filed by A123 Systems, Inc. in the U.S. District Court of Massachusetts; pp. 4; Apr. 7, 2006.
Hydro-Quebec's Motion to Dismiss for Want of Personal Jurisdiction and for Failure to Joint an Indispensable Party; pp. 2; Aug. 14, 2006.
A123 System, Inc.'s Motion to Stay Case Pending Reexamination Patents; pp. 2; Sep. 8, 2006.
A123 public announcement that it's batteries are being manufactured in China under contract with China BAK; pp. 9; Feb. 17, 2006.
China BAK's Form 8-K, filed with the Securities and Exchange Commission; pp. 17; May 19, 2006.
Complaint and Jury Demand filed by Hydro-Quebec and UT against A123 Systems, Inc., Black and Decker, and China BAK; pp. 21; Sep. 11, 2006.
European Office Action; Application No. 97923437.4-2119; pp. 3, Nov. 21, 2003.
Peter Bruce; "Curriculum Vitae"; School of Chemistry University of ST. Andrews; pp. 7.
List of Peter G. Bruce Publications; pp. 15.
PR Newswire; U.S. Scientist Honored with Japan Prize for Work on Lithium Batteries; pp. 1, Apr. 23, 2001.
A. Padhi's Norman Hackerman Young Author Award; pp. 1, 1997.
Office Action; U.S. Appl. No. 08/061,240; pp. 7, Oct. 22, 1993.
Whittingham; "The Hydrothermal Synthesis and Characterization of Olivines and Related Compounds for Electrochemical Applications"; www.rsc.org; pp. 15, 2007.
Yamada; "Phase Diagram of Lix(MnyFe1-y)PO4 ($0 \leq x$, $y \leq 1$)"; Journal of the Electrochemical Society, 148 (10); pp. 6, 2001.
Prosini et al.; "Synthesis and Characterization of Amorphous Hydrated FePO4 and Its Electrode Performance in Lithium Batteries"; Journal of the Electrochemical Society; 149(3); pp. 5, Jun. 24, 2005.
Whittingham et al.; "Temperature Dependent Properties of FePO4 Cathode Materials"; Material research Bulletin, 37; pp. 9, 2002.
Padhi; Redacted version of Padhi's UT Lab Notebook; pp. 124.
Redacted Versions of Battery Data Sheets; pp. 3.
Battery Test Charts from UT's Material Sciences Center; pp. 4.
Intellectual Property Disclosure of LiFePO4; The University of Texas at Austin, Nov. 13, 1995.
Intellectual Property Disclosure of LiFePO4; The University of Texas at Austin, Feb. 8, 1996.
Plaintiff's Pre-Hearing Claim Construction Brief and Exhibits; pp. 567, Oct. 12, 2009.
Motion for Summary Judgment and Brief in Support of Valence Technologies; pp. 103, Jan. 27, 2009.
Plaintiff's Response in Opposition to Defendant's Motion for Summary Judgment with Declaration and Exhibits; pp. 333, Feb. 9, 2009.
Joint Claims Chart—Reexamination U.S. Patent No. 5,910,382; pp. 97, Oct. 2, 2009.
Joint Claims Chart—Reexamination U.S. Patent No. 6,514,640; pp. 104, Oct. 2, 2009.
Valence's Claim Construction Brief; pp. 27, Oct. 12, 2009.
Plaintiff's Pre-Hearing Claim Construction Response Brief; pp. 355, Oct. 26, 2009.
Valence Technology's Response to Plaintiff's Claim Construction Opening Brief: pp. 27, Oct. 26, 2009.
European Search Report for EP Application No. 93108004 dated Aug. 11, 1993, 1 page.
Response to Patent Proprietor's Statement Setting Out the Grounds of Appeal for EP 0904607, dated Nov. 19, 2009, 34 pages.
Grounds of Appeal for EP 0904607 dated Jun. 24, 2009, 60 pages.
Decision Revoking EP 0904607 dated Feb. 24, 2009, 10 pages.
Minutes of Oral Proceedings for EP 0904607, dated Feb. 24, 2009, 8 pages.
Observation filed in Response to Patent Proprietor's Submission for EP 0904607, dated Nov. 17, 2008, 129 pages.
Oral Proceeding Response for EP 0904607, dated Oct. 28, 2008, 304 pages.
Observation filed in Response to Patent Proprietor's Submission for EP 0904607, dated Oct. 28, 2008, 28 pages.
Communication for EP 0904607, dated Oct. 9, 2008, 27 pages.
Observation filed in Response to Patent Proprietor's Submission for EP 0904607, dated Apr. 2, 2008, 10 pages.
Summons to Attend Oral Proceedings with Facts and Submission for EP 0904607, dated Feb. 29, 2008, 9 pages.
Observation filed in Response to Patent Proprietor's Submission for EP 0904607, dated Sep. 12, 2007, 3 pages.
Observation filed in Response to Patent Proprietor's Submission for EP 0904607, dated Jan. 17, 2007, 54 pages.
Response to Notice of Opposition for EP 0904607, dated May 11, 2006, 95 pages.
Notice of Opposition to EP 0904607 dated Jul. 27, 2005, 6 pages.
Communication in EP 0904607 dated Nov. 21, 2003, 4 pages.
Response in EP 0904607 dated Oct. 6, 2003, 11 pages.
Communication in EP 0904607 dated Mar. 26, 2003, 4 pages.
Communication in EP 0904607 dated Nov. 15, 2001, 5 pages.
Supplemental EP Search Report for Application No. 97923437.4-2119, dated Dec. 23, 1999, 20 pages.
Office Action from U.S. Appl. No. 11/179,617 dated Mar. 24, 2009, 15 pages.
Response to Office Action from U.S. Appl. No. 11/179,617 dated Sep. 24, 2009, 115 pages.
Office Action from U.S. Appl. No. 11/179,617 dated Jan. 19, 2010, 25 pages.
Request for Continued Examination and Amendment from U.S. Appl. No. 11/179,617 dated Jul. 19, 2010, 14 pages.
Supplemental Response to Office Action from U.S. Appl. No. 11/179,617 dated Aug. 13, 2010, 12 pages.
Response to Office Action from U.S. Appl. No. 11/179,617 dated Sep. 7, 2010, 7 pages.
Office Action from U.S. Appl. No. 11/648,316 dated Nov. 2, 2009, 6 pages.
Response to Office Action from U.S. Appl. No. 11/648,316 dated Dec. 2, 2009, 2 pages.
Office Action from U.S. Appl. No. 11/648,316 dated Mar. 17, 2010, 8 pages.
Response to Office Action from U.S. Appl. No. 11/648,316 dated Aug. 16, 2010, 14 pages.
Office Action from U.S. Appl. No. 11/647,899 dated Dec. 23, 2009, 9 pages.
Response to Office Action from U.S. Appl. No. 11/647,899 dated Jun. 22, 2010, 117 pages.
Supplemental Response to Office Action from U.S. Appl. No. 11/647,899 dated Aug. 13, 2010, 118 pages.
Office Action from U.S. Appl. No. 11/890,130 dated Nov. 17, 2009, 8 pages.
Response to Office Action from U.S. Appl. No. 11/890,130 dated Dec. 17, 2009, 2 pages.
Office Action from U.S. Appl. No. 11/890,130 dated Feb. 18, 2010, 11 pages.
Response to Office Action from U.S. Appl. No. 11/890,130 dated Aug. 18, 2010, 13 pages.
Office Action issued in JP 2007-128681, dated Aug. 12, 2010, 8 pages.
Defendant A123 Systems, Inc., Black & Decker Corporation, Black & Decker (U.S.) Inc.'s Preliminary Invalidity Contentions with Exhibits 1 and 2, Aug. 9, 2010, 66 pages.
Joint Claim construction and Prehearing Statement, with Exhibits 1-4, in Civil Action No. 3:06-CV-1655 B, Aug. 16, 2010, 126 pages.

Report and Recommendations of the Special Master Regarding United States Patent Nos. 6,514,640 and 5,910,382 in Case No. A06 CV 00111 SS, Aug. 24, 2010, 231 pages.
Office Action from U.S. Appl. No. 11/647,899 dated Sep. 1, 2010.
Office Action from U.S. Appl. No. 11/179,617 dated Sep. 1, 2010.
Okada, S. et al., "Characteristics of NASICON Related 3D Framework Cathodes: Li3Fe2(PO4)3, Li3 V2(PO4)3 and Li3FeV(PO4)3," Unknown Date, 2 pages.
Goodenough, J.B., et al., "Insertion of Lithium into Structures Containing Polyanions," Unknown Date, 29 pages.
Okada, S., et al., "Characteristics of 3D Framework Cathodes with the (XO4)n-Polyanions," Unknown Date, 1 page.
Goodenough, J.B., et al., "Insertion of Lithium into Structures Containing Polyanions," Unknown Date, 2 pages.
Masquelier, C., et al., "Li3Fe2(XO4)3, (X = P, As): Three Framework Structures as Hosts for the Reversible Insertion of Lithium," Power Sources Conference, Cherry Hill, New Jersey, Jun. 17-20, 1996, 3 pages.
Padhi, A.K., et al., "Lithium Intercalation into NASICON-type Mixed Phosphates: TiNb(PO4)3, LiFeNb(PO4)3 and Li2FeTi(PO4)3," Power Sources Conference, Cherry Hill, New Jersey, Jun. 17-20, 1996, 4 pages.
Padhi, A.K., et al., "Effect of Structure on the Redox Couples in Iron Phosphates," The Electrochemical Society, Inc.,Fall Meeting, San Antonio, Oct. 6-11, 1996, 2 pages.
Nanjundaswamy, K.S., et al., "Monitoring Transition-Metal Redox Potentials in Oxides by Lithium Insertion," Unknown Date, 2 pages.
Masquelier, C., et al., "Li3Fe2(XO4)3, X = P, As: Three Framework Structures as Hosts for the Reversible Insertion of Lithium,", 2 pages, Jun. 1, 1996.
Padhi, A.K., et al., "Lithium Intercalation into NASICON-type Mixed Phosphates: NbTi(PO4)3, LiFeNb(PO4)3 and Li2FeTi(PO4)3,", 2 pages, Jun. 1, 1996.
Padhi, A.K., "Mapping Redox Energies of Electrode Materials for Li-Ion Batteries,", 46 pages, May 1, 1997.
Padhi, A.K., "Mapping Redox Energies of Electrode Materials for Lithium Batteries,", 189 pages, May 1, 1997.
Padhi, A.K., et al., "Mapping of TRansition-MEtal Redox Couples in Phosphates with NASICON structure by lithium intercalation," Unknown Date, 26 pages.
Nanjundaswamy, K.S., et al., "Monitoring Transition-Metal Redox Potentials in Oxides by Lithium Insertion," Unknown Date, 5 pages.
Okada, S., et al., "Characteristics of 3D Framework Cathodes with (XO4) n-Polyanions," Unknown Date, 6 pages.
Masquelier, C., et al., "Insertion of Lithium into the Bronzoids β . . ." Unknown Date, 2 pages.
Okada, S., et al., "Characteristics of NASICON Related 3D Framework Cathodes, Li3Fe2(PO4)3, Li3V2(PO4)3 and the Solid Solution Li3FeV(PO4)3," Unknown Date, 6 pages.
Padhi, A.K., et al., "LiFePO4: A Novel Cathode Material for Rechargeable Lithium Batteries," The Electrochemical Society, Inc., Meeting Abstracts, vol. 96-1, Spring Meeting, Los Angeles, CA Mar. 22, 1996, 1 page.
Notice of Third Party Observation filed in Japanese Patent Application No. 2007-128681, Jan. 26, 2011, 2 pages.
Ni, et al., "Triphylite-Lithiophilite Series in China," Yanshi Kuangwuxue Zazhi, 1989, vol. 8(2), pp. 144-155.
Plaintiffs' Objections to the Special Master's Report and Recommendations, filed Sep. 3, 2010, 21 pages.
Valence's Objections to the Special Master's Report and Recommendations, filed Sep. 3, 2010, 11 pages.
Plaintiff's Response to Valence's Objections to the Special Master's Report and Recommendations, filed Sep. 14, 2010, 11 pages.
Valence's Response to Plaintiffs' Objections to the Special Master's Report and Recommendations, filed Sep. 14, 2010, 13 pages.
Valence's Reply to Plaintiffs' Response to Defendant's Objections to Special Master's Report and Recommendations, filed Sep. 27, 2010, 7 pages.
Plaintiffs' Reply to Defendant's Response to Plaintiffs' Objections to Special Master's Report and Recommendations, filed Sep. 27, 2010, 9 pages.
A123 Systems, Inc.'s Opening Brief on Claim Construction, with Exhibits, filed Oct. 1, 2010, 711 pages.
Amended Joint Claim Construction and Prehearing Statement, filed Oct. 1, 2010, 131 pages.
Plaintiffs' Opening Claim Construction Brief, filed Oct. 1, 2010, 109 pages.
Plaintiffs' Responsive Claim Construction Brief, filed Oct. 22, 2010, 85 pages.
A123 Systems, Inc.'s Answering Brief on Claim Construction, filed Oct. 22, 2010, 44 pages.
Office Action issued in U.S. Appl. No. 11/648,316 dated Nov. 12, 2010.
Office Action issued in U.S. Appl. No. 11/890,130 dated Nov. 5, 2010.
Office Action issued in U.S. Appl. No. 12/859,865 dated Nov. 17, 2010.
Office Action issued in U.S. Appl. No. 12/877,744 dated Nov. 18, 2010.
Office Action issued in U.S. Appl. No. 12/859,991 dated Dec. 6, 2010.
Office Action issued in U.S. Appl. No. 12/860,012 dated Nov. 16, 2010.
Office Action issued in U.S. Appl. No. 12/877,838 dated Nov. 19, 2010.
Office Action issued in U.S. Appl. No. 11/179,617 dated Nov. 24, 2010.
Notice of Allowance issued in U.S. Appl. No. 12/859,991 dated Mar. 17, 2011.
Response to Office Action in U.S. Appl. No. 12/859,991 dated Mar. 7, 2011.
Response to Office Action in U.S. Appl. No. 12/859,865 dated Feb. 17, 2011.
Notice of Allowance issued in U.S. Appl. No. 12/859,865 dated Mar. 11, 2011.
Response to Office Action in U.S. Appl. No. 12/877,744 dated Feb. 17, 2011.
Notice of Allowance issued in U.S. Appl. No. 12/877,744 dated Mar. 11, 2011.
Office Action issued in U.S. Appl. No. 12/877,811 dated May 31, 2011.
Office Action issued in U.S. Appl. No. 12/859,965 dated Mar. 31, 2011.
Response to Office Action in U.S. Appl. No. 12/877,838 dated Feb. 18, 2011.
Notice of Allowance issued in U.S. Appl. No. 12/877,838 dated Mar. 2, 2011.
Office Action issued in U.S. Appl. No. 11/647,899 dated Feb. 18, 2011.
Response to Office Action in U.S. Appl. No. 11/647,899 dated Feb. 25, 2011.
Notice of Allowance issued in U.S. Appl. No. 11/647,899 dated May 19, 2011.
Supplemental Response to Office Action in U.S. Appl. No. 11/647,899 dated Feb. 14, 2011.
Request for Inter Partes Reexamination for Patent 7,955,733 dated Jun. 8, 2011.

* cited by examiner

US 8,282,691 B2

CATHODE MATERIALS FOR SECONDARY (RECHARGEABLE) LITHIUM BATTERIES

This is a continuation of application Ser. No. 12/952,978, filed Nov. 23, 2010 (currently pending); which is a continuation application of application Ser. No. 11/179,617, filed Jul. 13, 2005 (now abandoned), which is a continuation of application Ser. No. 10/902,142, filed Jul. 30, 2004 (now abandoned), which is a continuation of application Ser. No. 10/307,346, filed Dec. 2, 2002 (now abandoned), which is a continuation of application Ser. No. 08/998,264, filed Dec. 24, 1997 (now U.S. Pat. No. 6,514,640, issued Feb. 4, 2003), which is a continuation-in-part of application Ser. No. 08/840,523 (now U.S. Pat. No. 5,910,382, issued Jun. 8, 1999), filed Apr. 21, 1997. This application claims priority through the above-identified applications to provisional patent Application No. 60/032,346, filed Dec. 4, 1996, and provisional patent Application No. 60/016,060, filed Apr. 23, 1996. The entire text of each of the above-referenced disclosures is specifically incorporated by reference herein without disclaimer. The Robert A. Welch Foundation, Houston, Tex., supported research related to the present invention.

BACKGROUND OF THE INVENTION

1. Field of the Invention

The present invention relates to secondary (rechargeable) alkali-ion batteries. More specifically, the invention relates to materials for use as electrodes for an alkali-ion battery. The invention provides transition-metal compounds having the ordered olivine or the rhombohedral NASICON structure and containing the polyanion $(PO_4)^{3-}$ as at least one constituent for use as an electrode material for alkali-ion rechargeable batteries.

2. Description of the Related Art

Present-day lithium batteries use a solid reductant as the anode and a solid oxidant as the cathode. On discharge, the metallic anode supplies $Li^+$ ions to the $Li^+$-ion electrolyte and electrons to the external circuit. The cathode is typically an electronically conducting host into which $Li^+$ ions are inserted reversibly from the electrolyte as a guest species and charge-compensated by electrons from the external circuit. The chemical reactions at the anode and cathode of a lithium secondary battery must be reversible. On charge, removal of electrons from the cathode by an external field releases $Li^+$ ions back to the electrolyte to restore the parent host structure, and the addition of electrons to the anode by the external field attracts charge-compensating $Li^+$ ions back into the anode to restore it to its original composition.

Present-day rechargeable lithium-ion batteries use a coke material into which lithium is inserted reversibly as the anode and a layered or framework transition-metal oxide is used as the cathode host material (Nishi et al., U.S. Pat. No. 4,959,281). Layered oxides using Co and/or Ni are expensive and may degrade due to the incorporation of unwanted species from the electrolyte. Oxides such as $Li_{1\pm x}[Mn_2]O_4$, which has the $[M_2]O_4$ spinel framework, provide strong bonding in three dimensions and an interconnected interstitial space for lithium insertion. However, the small size of the $O^{2-}$ ion restricts the free volume available to the $Li^+$ ions, which limits the power capability of the electrodes. Although substitution of a larger $S^{2-}$ ion for the $O^{2-}$ ion increases the free volume available to the $Li^+$ ions, it also reduces the output voltage of an elementary cell.

A host material that will provide a larger free volume for $Li^+$-ion motion in the interstitial space would allow realization of a higher lithium-ion conductivity $\sigma_{Li}$, and hence higher power densities. An oxide is needed for output voltage, and hence higher energy density. An inexpensive, non-polluting transition-metal atom within the host structure would make the battery environmentally benign.

SUMMARY OF THE INVENTION

The present invention meets these goals more adequately than previously known secondary battery cathode materials by providing oxides containing larger tetrahedral oxide polyanions forming 3D framework host structures with octahedral-site transition-metal oxidant cations, such as iron, that are environmentally benign.

The present invention provides electrode material for a rechargeable electrochemical cell comprising an anode, a cathode and an electrolyte. The cell may additionally include an electrode separator. As used herein, "electrochemical cell" refers not only to the building block, or internal portion, of a battery but is also meant to refer to a battery in general. Although either the cathode or the anode may comprise the material of the invention, the material will preferably be useful in the cathode.

Generally, in one aspect, the invention provides an ordered olivine compound having the general formula $LiMPO_4$, where M is at least one first-row transition-metal cation. The alkali ion $Li^+$ may be inserted/extracted reversibly from/to the electrolyte of the battery to/from the interstitial space of the host $MPO_4$ framework of the ordered-olivine structure as the transition-metal M cation (or combination of cations) is reduced/oxidized by charge-compensating electrons supplied/removed by the external circuit of the battery in, for a cathode material, a discharge/charge cycle. In particular, M will preferably be Mn, Fe, Co, Ti, Ni or a combination thereof. Examples of combinations of the transition-metals for use as the substituent M include, but are not limited to, $Fe_{1-x}Mn_x$, and $Fe_{1-x}Ti_x$, where $0<x<1$.

Preferred formulas for the ordered olivine electrode compounds of the invention include, but are not limited to $LiFePO_4$, $LiMnPO_4$, $LiCoPO_4$, $LiNiPO_4$, and mixed transition-metal compounds such as $Li_{1-2x}Fe_{1-x}Ti_xPO_4$ or $LiFe_{1-x}Mn_xPO_4$, where $0<x<1$. However, it will be understood by one of skill in the art that other compounds having the general formula $LiMPO_4$ and an ordered olivine structure are included within the scope of the invention.

The electrode materials of the general formula $LiMPO_4$ described herein typically have an ordered olivine structure having a plurality of planes defined by zigzag chains and linear chains, where the M atoms occupy the zigzag chains of octahedra and the Li atoms occupy the linear chains of alternate planes of octahedral sites.

In another aspect, the invention provides electrode materials for a rechargeable electrochemical cell comprising an anode, a cathode and an electrolyte, with or without an electrode separator, where the electrode materials comprise a rhombohedral NASICON material having the formula $Y_xM_2(PO_4)_3$, where $0 \leq x \leq 5$. Preferably, the compounds of the invention will be useful as the cathode of a rechargeable electrochemical cell. The alkali ion Y may be inserted from the electrolyte of the battery to the interstitial space of the rhombohedral $M_2(XO_4)_3$ NASICON host framework as the transition-metal M cation (or combination of cations) is reduced by charge-compensating electrons supplied by the external circuit of the battery during discharge with the reverse process occurring during charge of the battery. While it is contemplated that the materials of the invention may consist of either a single rhombohedral phase or two phases, e.g. orthorhombic and monoclinic, the materials are preferably single-phase rhombohedral NASICON compounds. Generally, M will be at least one first-row transition-metal cation and Y will be Li or Na. In preferred compounds, M will be Fe, V, Mn, or Ti and Y will be Li.

Redox energies of the host M cations can be varied by a suitable choice of the $XO_4$ polyanion, where X is taken from Si, P, As, or S and the structure may contain a combination of such polyanions. Tuning of the redox energies allows optimization of the battery voltage with respect to the electrolyte used in the battery. The invention replaces the oxide ion $O^{2-}$ of conventional cathode materials by a polyanion $(XO_4)^{m-}$ to take advantage of (1) the larger size of the polyanion, which can enlarge the free volume of the host interstitial space available to the alkali ions, and (2) the covalent X—O bonding, which stabilizes the redox energies of the M cations with M-O—X bonding so as to create acceptable open-circuit voltages $V_{OC}$ with environmentally benign $Fe^{3+}/Fe^{2+}$ and/or $Ti^{4+}/Ti^{3+}$ or $V^{4+}/V^{3+}$ redox couples.

Preferred formulas for the rhombohedral NASICON electrode compounds of the invention include, but are not limited to those having the formula $Li_{3+x}Fe_2(PO_4)_3$, $Li_{2+x}FeTi(PO_4)_3$, $Li_xTiNb(PO_4)_3$, and $Li_{1+x}FeNb(PO_4)_3$, where 0<x<2. It will be understood by one of skill in the art that Na may be substituted for Li in any of the above compounds to provide cathode materials for a Na ion rechargeable battery. For example, one may employ $Na_{3+x}Fe_2(PO_4)_3$, $Na_{2+x}FeTi(PO_4)_3$, $Na_xTiNb(PO_4)_3$ or $Na_{1+x}FeNb(PO_4)_3$, where 0<x<2, in a Na ion rechargeable battery. In this aspect, $Na^+$ is the working ion and the anode and electrolyte comprise a Na compound.

Compounds of the invention having the rhombohedral NASICON structure form a framework of $MO_6$ octahedra sharing all of their corners with $XO_4$ tetrahedra (X=Si, P, As, or S), the $XO_4$ tetrahedra sharing all of their corners with octahedra. Pairs of $MO_6$ octahedra have faces bridged by three $XO_4$ tetrahedra to form "lantern" units aligned parallel to the hexagonal c-axis (the rhombohedral [111] direction), each of these $XO_4$ tetrahedra bridging to two different "lantern" units. The $Li^+$ or $Na^+$ ions occupy the interstitial space within the $M_2(XO_4)_3$ framework. Generally, $Y_xM_2(XO_4)_3$ compounds with the rhombohedral NASICON framework may be prepared by solid-state reaction of stoichiometric proportions of the Y, M, and $XO_4$ groups for the desired valence of the M cation. Where Y is Li, the compounds may be prepared indirectly from the Na analog by ion exchange of $Li^+$ for $Na^+$ ions in a molten $LiNO_3$ bath at 300° C. For example, rhombohedral $LiTi_2(PO_4)_3$ may be prepared from intimate mixtures of $Li_2CO_3$ or $LiOH.H_2O$, $TiO_2$, and $NH_4H_2PO_4.H_2O$ calcined in air at 200° C. to eliminate $H_2O$ and $CO_2$ followed by heating in air for 24 hours near 850° C. and a further heating for 24 hours near 950° C. However, preparation of $Li_3Fe_2(PO_4)_3$ by a similar solid-state reaction gives the undesired monoclinic framework. To obtain the rhombohedral form, it is necessary to prepare rhombohedral $Na_3Fe_2(PO_4)_3$ by solid-state reaction of $NaCO_3$, $Fe\{CH_2COOH\}_2$ and $NH_4H_2PO_4.H_2O$, for example. The rhombohedral form of $Li_3Fe_2(PO_4)_3$ is then obtained at 300° C. by ion exchange of $Li^+$ for $Na^+$ in a bath of molten $LiNO_3$. It will be understood by one of skill in the art that the rhombohedral Na compounds will be useful as cathode materials in rechargeable Na ion batteries.

In another aspect of the invention, the rhombohedral NASICON electrode compounds may have the general formula $Y_xM_2(PO_4)_y(XO_4)_{3-y}$, where 0<y≦3, M is a transition-metal atom, Y is Li or Na, and X=Si, As, or S and acts as a counter cation in the rhombohedral NASICON framework structure. In this aspect, the compound comprises a phosphate anion as at least part of an electrode material. In preferred embodiments, the compounds are used in the cathode of a rechargeable battery. Preferred compounds having this general formula include, but are not limited to $Li_{1+x}Fe_2(SO_4)_2(PO_4)$, where 0≦x≦1.

The rhombohedral NASICON compounds described above may typically be prepared by preparing an aqueous solution comprising a lithium compound, an iron compound, a phosphate compound and a sulfate compound, evaporating the solution to obtain dry material and heating the dry material to about 500° C. Preferably, the aqueous starting solution comprises $FeCl_3$, $(NH_4)_2SO_4$, and $LiH_2PO_4$.

In a further embodiment, the invention provides electrode materials for a rechargeable electrochemical cell comprising an anode, a cathode and an electrolyte, with or without an electrode separator, where the electrode materials have a rhombohedral NASICON structure with the general formula $A_{3-x}V_2(PO_4)_3$. In these compounds, A may be Li, Na or a combination thereof and 0≦x≦2. In preferred embodiments, the compounds are a single-phase rhombohedral NASICON material. Preferred formulas for the rhombohedral NASICON electrode compounds having the general formula $A_{3-x}V_2(PO_4)_3$ include, but are not limited to those having the formula $Li_{2-x}NaV_2(PO_4)_3$, where 0≦x≦2.

The rhombohedral NASICON materials of the general formula $A_{3-x}V_2(PO_4)_3$ may generally be prepared by the process outlined in FIG. 9. Alternatively, $Li_2NaV_2(PO_4)_3$ may be prepared by a direct solid-state reaction from $LiCO_3$, $NaCO_3$, $NH_4H_2PO_4.H_2O$ and $V_2O_3$.

In a further aspect, the invention provides a secondary (rechargeable) battery where an electrochemical cell comprises two electrodes and an electrolyte, with or without an electrode separator. The electrodes are generally referred to as the anode and the cathode. The secondary batteries of the invention generally comprise as electrode material, and preferably as cathode material, the compounds described above. More particularly, the batteries of the invention have a cathode comprising the ordered olivine compounds described above or the rhombohedral NASICON compounds described above.

BRIEF DESCRIPTION OF THE DRAWINGS

The following drawings form part of the present specification and are included to demonstrate further certain aspects of the present invention. The invention may be better understood by reference to one or more of these drawings in combination with the detailed description of specific embodiments presented herein.

FIG. 2A shows discharge/charge curves at 0.05 $mA\cdot cm^{-2}$ (0.95 $mA\cdot g^{-1}$) for the olivine $Li_{1-x}FePO_4$ as cathode and lithium as anode. A plateau at 3.4V corresponds to the $Fe^{3+}/Fe^{2+}$ redox couple relative to the lithium anode. FIG. 2B shows discharge/charge curves at 0.05 $mA\cdot cm^{-2}$ (1.13 $mA\cdot g^{-1}$) for the olivine $Li_{1-x}Fe_{0.5}Mn_{0.5}PO_4$ as cathode relative to a lithium anode. A plateau at 3.4V corresponds to the $Fe^{3+}/Fe^{2+}$ redox couple relative to the lithium anode. A plateau at 4.1 V corresponds to the $Mn^{3+}/Mn^{2+}$ couple. FIG. 2C shows discharge/charge curves vs. lithium at 0.05 mA·cm$^{-2}$ (0.95 mA·g$^{-1}$) for the olivine $Li_{1-x}FePO_4$.

FIG. 5A shows the rhombohedral R3c (NASICON) framework structure of $Li_3Fe_2(PO_4)_3$ prepared by ion exchange from $Na_3Fe_2(PO_4)_3$; FIG. 5B shows the monoclinic $P2_1/n$ framework structure of $Li_3Fe_2(PO_4)_3$ prepared by solid-state reaction. The large, open three-dimensional framework of $FeO_6$ octahedra and $PO_4$ tetrahedra allows an easy diffusion of the lithium ions.

FIG. 6A shows discharge/charge curves vs. lithium at 0.1 mA·cm$^{-2}$ for rhombohedral $Li_{3+x}Fe_2(PO_4)_3$ where 0<x<2. The shape of the curve for lithium insertion into rhombohedral $Li_{3+x}Fe_2(PO_4)_3$ is surprisingly different from that for the monoclinic form. However, the average $V_{OC}$ at 2.8 V remains the same. The Li$^+$-ion distribution in the interstitial space appears to vary continuously with x with a high degree of disorder. FIG. 6B shows discharge/charge curves vs. lithium at 0.1 mA·cm$^{-2}$ for monoclinic $Li_{3+x}Fe_2(PO_4)_3$ where $0 \leq x \leq 2$.

FIG. 7A shows discharge curves vs. a lithium anode at current densities of 0.05-0.5 mA·cm$^{-2}$ for rhombohedral $Li_{3+x}Fe_2(PO_4)_3$. A reversible capacity loss on increasing the current density from 0.05 to 0.5 mA·cm$^{-2}$ is shown. This loss is much reduced compared to what is encountered with the monoclinic system. FIG. 7B shows discharge curves at current densities of 0.05-0.5 mA·cm$^{-2}$ for monoclinic $Li_{3+x}Fe_2(PO_4)_3$.

DESCRIPTION OF ILLUSTRATIVE EMBODIMENTS

Figure 1:
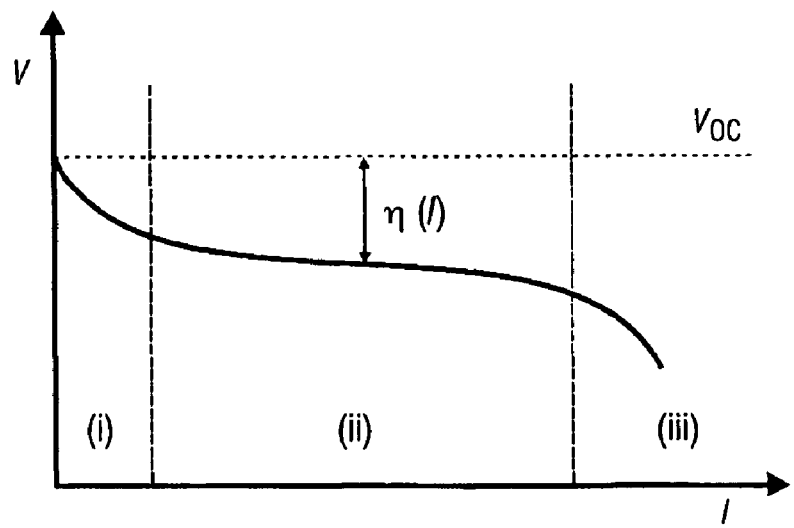
FIG. 1 shows a typical polarization curve for the battery voltage V vs. the I delivered across a load. The voltage drop $(V_{OC}-V)\equiv\eta(I)$ of a typical curve is a measure of the battery resistance Rb(I). The interfacial voltage drops saturate in region (i). The slope of the curve in region (ii) is $dV/dI \approx R_{e1}+R_C(A)+R_C(C)$, the sums of the electrolyte resistance $R_{e1}$ and the current-collector resistances at the anode and cathode. Region (iii) is diffusion-limited. At the higher currents I, normal processes do not bring ions to or remove them from the electrode/electrolyte interfaces rapidly enough to sustain an equilibrium reaction.

Present-day secondary (rechargeable) lithium batteries use a solid reductant as the anode, or negative electrode, and a solid oxidant as the cathode, or positive electrode. It is important that the chemical reactions at the anode and cathode of a lithium secondary battery be reversible. On discharge, the metallic anode supplies Li$^+$ ions to the Li$^+$-ion electrolyte and electrons to the external circuit. The cathode is a host compound into/from which the working Li$^+$ ion of the electrolyte can be inserted/extracted reversibly as a guest species over a large solid-solubility range (Goodenough 1994). When the Li$^+$ ions are inserted as a guest species into the cathode, they are charge-compensated by electrons from the external circuit. On charge, the removal of electrons from the cathode by an external field releases Li$^+$ ions back to the electrolyte to restore the parent host structure. The resultant addition of electrons to the anode by the external field attracts charge-compensating Li$^+$ ions back into the anode to restore it to its original composition.

The present invention provides new materials for use as cathodes in lithium secondary (rechargeable) batteries. It will be understood that the anode for use with the cathode material of the invention may be any lithium anode material, such as a reductant host for lithium or elemental lithium itself. Preferably, the anode material will be a reductant host for lithium. Where both the anode and cathode are hosts for the reversible insertion or removal of the working ion into/from the electrolyte, the electrochemical cell is commonly called a "rocking-chair" cell. An implicit additional requirement of a secondary battery is maintenance not only of the electrode/electrolyte interfaces, but also of electrical contact between host particles, throughout repeated discharge/recharge cycles.

Since the volumes of the electrode particles change as a result of the transfer of atoms from one to another electrode in a reaction, this requirement normally excludes the use of a crystalline or glassy electrolyte with a solid electrode. A non-aqueous liquid or polymer electrolyte having a large energy-gap window between its highest occupied molecular orbital (HOMO) and its lowest unoccupied molecular orbital (LUMO) is used with secondary lithium batteries in order to realize higher voltages. For example, practical quantities of very ionic lithium salts such as $LiClO_4$, $LiBF_4$ and $LiPF_6$ can be dissolved in empirically optimized mixtures of propylene carbonate (PC), ethylene carbonate (EC), or dimethyl carbonate (DMC) to provide acceptable electrolytes for use with the cathodes of the invention. It will be recognized by those of skill in the art that the $(ClO_4)^-$ anion is explosive and not typically suitable for commercial applications.

General Design Considerations

The power output P of a battery is the product of the electric current I delivered by the battery and the voltage V across the negative and positive posts (equation 1).

$$P=IV \qquad (1)$$

The voltage V is reduced from its open-circuit value $V_{OC}$ (I=0) by the voltage drop $IR_b$ due to the internal resistance $R_b$ of the battery (equation 2).

$$V=V_{OC}-IR_b \qquad (2)$$

The open-circuit value of the voltage is governed by equation 3.

$$V_{OC}=(\mu_A-\mu_C)/(-nF)<5V \qquad (3)$$

In equation 3, n is the number of electronic charges carried by the working ion and F is Faraday's constant. The magnitude of the open-circuit voltage is constrained to $V_{OC}<5V$ not only by the attainable difference $\mu_A-\mu_C$ of the electrochemical potentials of the anode reductant and the cathode oxidant, but also by the energy gap $E_g$ between the HOMO (highest occupied molecular orbital) and the LUMO (lowest unoccupied molecular orbital) of a liquid electrolyte or by the energy gap $E_g$ between the top of the valence band and the bottom of the conduction band of a solid electrolyte.

The chemical potential $\mu_A$, which is the Fermi energy $\epsilon_F$ of a metallic-reductant anode or the HOMO of a gaseous or liquid reductant, must lie below the LUMO of a liquid electrolyte or the conduction band of a solid electrolyte to achieve thermodynamic stability against reduction of the electrolyte by the reductant. Similarly, the chemical potential $\mu_A-\mu_C$, which is the LUMO of a gaseous or liquid oxidant or the Fermi energy of a metallic-oxidant cathode, must lie above the HOMO of a liquid electrolyte or the valence band of a solid electrolyte to achieve thermodynamic stability against oxidation of the electrolyte by the oxidant. Thermodynamic stability thus introduces the constraint $$\mu_A - \mu_C \leq E_g \quad (4)$$

as well as the need to match the "window" $E_g$ of the electrolyte to the energies $\mu_A$ and $\mu_C$ of the reactants to maximize $V_{OC}$. It follows from equations 1 and 2 that realization of a high maximum power $P_{max}$ (equation 5) requires, in addition to as high a $V_{OC}$ as possible, a low internal battery resistance Rb (see equation 6).

$$P_{max} = I_{max} V_{max} \quad (5)$$

$$R_b = R_{el} + R_{in}(A) + R_{in}(C) + R_C(A) + R_C(C) \quad (6)$$

The electrolyte resistance $R_{el}$ to the ionic current is proportional to the ratio of the effective thickness L to the geometrical area A of the interelectrode space that is filled with an electrolyte of ionic conductivity $\sigma_i$ (equation 7).

$$R_{el} = (L/\sigma_i A) \quad (7)$$

Since ions move diffusively, $\sigma_i$ (see equation 8) increases with temperature. A $\sigma_i \leq 0.1$ Scm$^{-1}$ (the maximum $\sigma_i$ represents the room-temperature protonic conductivity $\sigma_H$ in a strong acid) at an operating temperature $T_{op}$ dictates the use of a membrane separator of large geometrical area A and small thickness L.

$$\sigma_{Li} = (B/T) \exp(-E_a/kT) \quad (8)$$

The resistance to transport of the working ion across the electrolyte-electrode interfaces is proportional to the ratio of the geometrical and interfacial areas at each electrode:

$$R_{in} \sim A/A_{in} \quad (9)$$

where the chemical reaction of the cell involves ionic transport across an interface, equation 9 dictates construction of a porous, small-particle electrode. Achievement and retention of a high electrode capacity, i.e., utilization of a high fraction of the electrode material in the reversible reaction, requires the achievement and retention of good electronic contact between particles as well as a large particle-electrolyte interface area over many discharge/charge cycles. If the reversible reaction involves a first-order phase change, the particles may fracture or lose contact with one another on cycling to break a continuous electronic pathway to the current collector.

Loss of interparticle electrical contact results in an irreversible loss of capacity. There may also be a reversible capacity fade. Where there is a two-phase process (or even a sharp guest-species gradient at a diffusion front) without fracture of the particles, the area of the interface (or diffusion front) decreases as the second phase penetrates the electrode particle. At a critical interface area, diffusion across the interface may not be fast enough to sustain the current I, so not all of the particle is accessible. The volume of inaccessible electrode increases with I, which leads to a diffusion-limited reversible capacity fade that increases with I. This problem becomes more important at lower ionic conductivity $\sigma_{Li}$.

The battery voltage V vs. the current I delivered across a load is called the polarization curve. The voltage drop $(V_{OC} - V) = \eta(I)$ of a typical curve, FIG. 1, is a measure of the battery resistance (see equation 10).

$$R_b(I) = \eta(I)/I \quad (10)$$

On charging, $\eta(I) = (V_{app} - V_{OC})$ is referred to as an overvoltage. The interfacial voltage drops saturate in region (i) of FIG. 1; therefore in region (ii) the slope of the curve is $$dV/dI = R_{el} + R_C(A) + R_C(C) \quad (11)$$

Region (iii) is diffusion-limited; at the higher currents I, normal processes do not bring ions to or remove them from the electrode/electrolyte interfaces rapidly enough to sustain an equilibrium reaction.

The battery voltage V vs. the state of charge, or the time during which a constant current I has been delivered, is called a discharge curve.

Cathode Materials

The cathode, or positive electrode, material of the present invention, for use in a secondary lithium battery, consists of a host structure into which lithium can be inserted reversibly. The maximum power output, $P_{max}$ (see equation 5) that can be achieved by a cell depends on the open-circuit voltage $V_{OC} = \Delta E/e$ and the overvoltage $\eta(I)$ at the current $I_{max}$ of maximum power $$V_{max} = V_{OC} - \eta(I) \quad (12)$$

$\Delta E$ is the energy difference between the work function of the anode (or the HOMO of the reductant) and that of the cathode (or the LUMO of the oxidant). In order to obtain a high $V_{OC}$, it is necessary to use a cathode that is an oxide or a halide. It is preferable that the cathode be an oxide in order to achieve a large $V_{OC}$ and good electronic conductivity. To minimize $\eta(I_{max})$, the electrodes must be good electronic as well as ionic conductors and they must offer a low resistance to mass transfer across the electrode/electrolyte interface. To obtain a high $I_{max}$, it is necessary to have a large electrode/electrolyte surface area. In addition, where there is a two-phase interface within the electrode particle, the rate of mass transfer across this interface must remain large enough to sustain the current. This constraint tends to limit the electrode capacity more as the current increases.

Oxide host structures with close-packed oxygen arrays may be layered, as in $Li_{1-x}CoO_2$ (Mizushima, et al. 1980), or strongly bonded in three dimensions (3D) as in the manganese spinels $Li_{1-x}[Mn_2]O_4$ (Thackeray 1995; Thackeray et al. 1983; Thackeray et al. 1984; Guyomard and Tarascon 1992; and Masquelier et al. 1996). Li intercalation into a van der Waals gap between strongly bonded layers may be fast, but it can also be accompanied by unwanted species from a liquid electrolyte. On the other hand, strong 3D bonding within a close-packed oxygen array, as occurs in the spinel framework $[Mn_2]O_4$, offers too small a free volume for the guest Li$^+$ ions to have a high mobility at room temperature, which limits $I_{max}$. Although this constraint in volume of the interstitial space makes the spinel structure selective for insertion of Li$^+$ ions, it reduces the Li$^+$-ion mobility and hence Li$^+$-ion conductivity $\sigma_{Li}$. The oxospinels have a sufficiently high $\sigma_{Li}$, to be used commercially in low-power cells (Thackeray et al., 1983) but would not be acceptable for the high power cells of the insertion.

The present invention overcomes these drawbacks by providing cathode materials containing larger tetrahedral polyanions which form 3D framework host structures with octahedral-site transition-metal oxidant cations. In the cathode materials of the invention having the NASICON structure, the transition-metal ions are separated by the polyanions, so the electronic conductivity is polaronic rather than metallic. Nevertheless, the gain in $\sigma_{Li}$ more than offsets the loss in electronic conductivity.

Variation of the energy of a given cation redox couple from one compound to another depends on two factors: (a) the magnitude of the crystalline electric field at the cation, which may be calculated for a purely ionic model by a Madelung summation of the Coulomb fields from the other ions present, and (b) the covalent contribution to the bonding, which may be modulated by the strength of the covalent bonding at a nearest-neighbor counter cation. The stronger is the negative Madelung potential at a cation, the higher is a given redox energy of a cation. Similarly the stronger is the covalent bonding of the electrons at a transition-metal cation, the higher is a given redox energy of that cation. The lower the redox energy of the cation host transition-metal ion, the larger is $V_{OC}$.

The redox couples of interest for a cathode are associated with antibonding states of d-orbital parentage at transition-metal cations M or 4f-orbital parentage at rare-earth cations Ln in an oxide. The stronger is the cation-anion covalent mixing, the higher is the energy of a given LUMO/HOMO redox couple. Modulation of the strength of the cation-anion covalence at a given M or Li cation by nearest-neighbor cations that compete for the same anion valence electrons is known as the inductive effect. Changes of structure alter primarily the Madelung energy as is illustrated by raising of the redox energy within a spinel $[M_2]O_4$ framework by about 1 eV on transfer of $Li^+$ ions from tetrahedral to octahedral interstitial sites. Changing the counter cation, but not the structure, alters primarily the inductive effect, as is illustrated by a lowering of the $Fe^{3+}/Fe^{2+}$ redox energy by 0.6 eV on changing $(MoO_4)^{2-}$ or $(WO_4)^{2-}$ to $(SO_4)^{2-}$ polyanions in isostructural $Fe_2(XO_4)_3$ compounds. Raising the energy of a given redox couple in a cathode lowers the voltage obtained from cells utilizing a common anode. Conversely, raising the redox energy of an anode raises the cell voltage with respect to a common cathode.

The invention provides new cathode materials containing oxide polyanions, including the oxide polyanion $(PO_4)^{3-}$ as at least one constituent, for use in secondary (rechargeable) batteries. For example, the cathode materials of the present invention may have the general formula $LiM(PO_4)$ with the ordered olivine structure, or the more open rhombohedral NASICON framework structure. The cathode materials of the present invention have the general formula $LiM(PO_4)$ for the ordered olivine structure, or $Y_xM_2(PO_4)_y(XO_4)_{3-y}$ for the rhombohedral NASICON framework structure.

The olivine structure of $Mg_2SiO_4$ consists of a slightly distorted array of oxygen atoms with $Mg^{2+}$ ions occupying half the octahedral sites in two different ways. In alternate basal planes, they form zigzag chains of corner-shared octahedra running along the c-axis and in the other basal planes they form linear chains of edge-shared octahedra running also along the c-axis.

In the ordered $LiMPO_4$ olivine structures of the invention, the M atoms occupy the zigzag chains of octahedra and the Li atoms occupy the linear chains of the alternate planes of octahedral sites. In this embodiment of the present invention, M is preferably Mn, Fe, Co, Ni or combinations thereof. Removal of all of the lithium atoms leaves the layered $FePO_4$-type structure, which has the same Pbnm orthorhombic space group. These phases may be prepared from either end, e.g., $LiFePO_4$ (triphylite) or $FePO_4$ (heterosite), by reversible extraction or insertion of lithium.

Figure 2A:
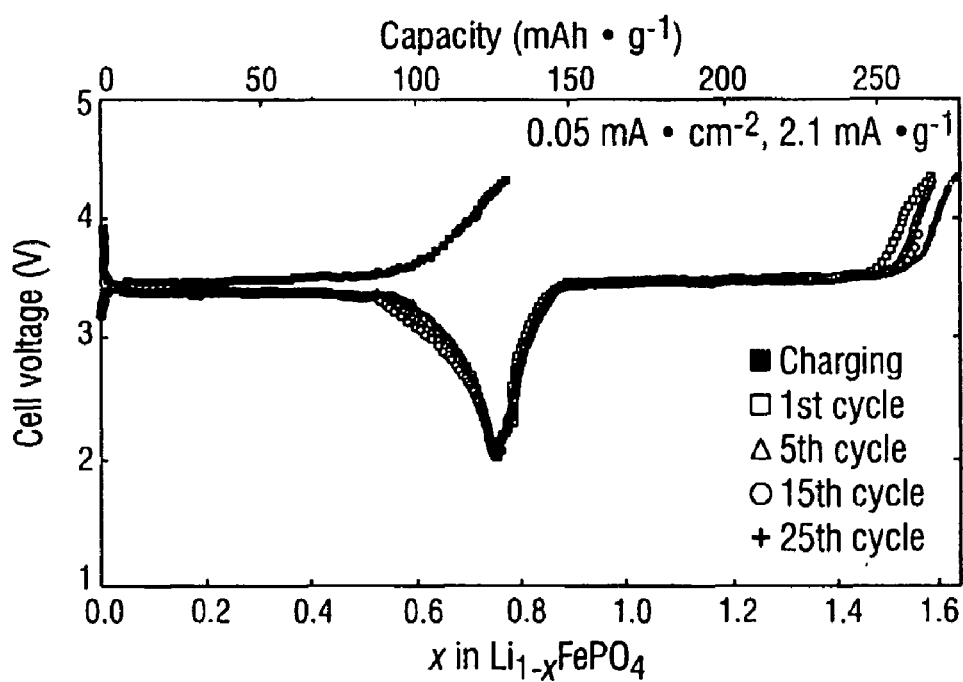
FIGS. 2A, 2B and 2C.
Figure 2B:
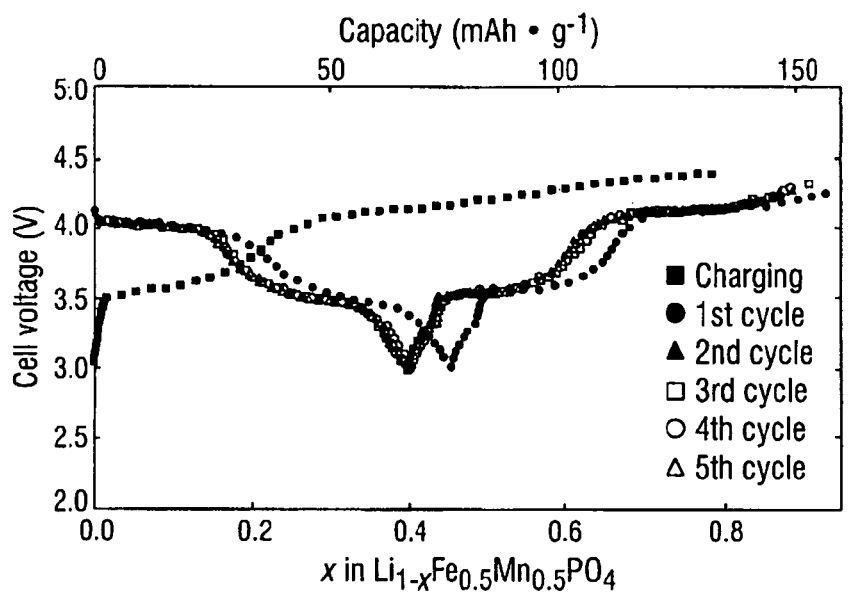
Figure 2C:
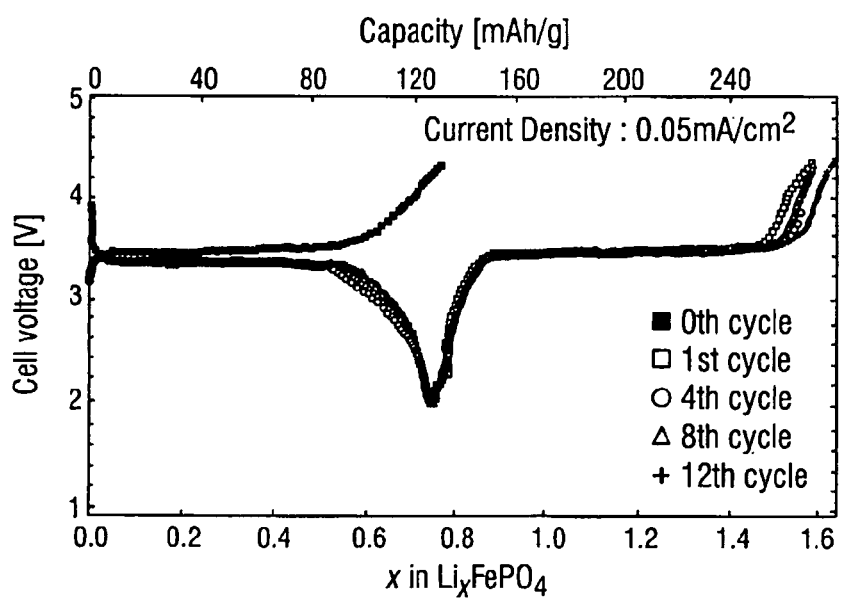

FIG. 2A, FIG. 2B and FIG. 2C show discharge/charge curves vs. lithium at $0.05$ $mA \cdot cm^{-2}$ ($0.95$ $mA \cdot g^{-1}$ and $1.13$ $mA \cdot g^{-1}$, respectively) for $Li_{1-x}FePO_4$, $Li_{1-x}Fe_{0.5}Mn_{0.5}PO_4$ and $LiFePO_4$, respectively, where $0 \leq x \leq 0.5$. A plateau at 3.4 V corresponds to the $Fe^{3+}/Fe^{2+}$ redox couple and a plateau at 4.1 V corresponds to the $Mn^{3+}/Mn^{2+}$ couple. With $LiClO_4$ in PC and DME as the electrolyte, it is only possible to charge up a cathode to 4.3 V vs. a lithium anode, so it was not possible to extract lithium from $LiMnPO_4$, $LiCoPO_4$ and $LiNiPO_4$ with this electrolyte. However, in the presence of iron, the $Mn^{3+}/Mn^{2+}$ couple becomes accessible. The inaccessibility is due to the stability of the $Mn^{3+}/Mn^{2+}$, $Co^{3+}/Co^{2+}$ and $Ni^{3+}/Ni^{2+}$ couples in the presence of the polyanion $(PO_4)^{3-}$. The relatively strong covalence of the $PO_4$ tetrahedron of the compounds of the present invention stabilizes the redox couples at the octahedral sites to give the high $V_{OC}$'s that are observed.

Figure 3:
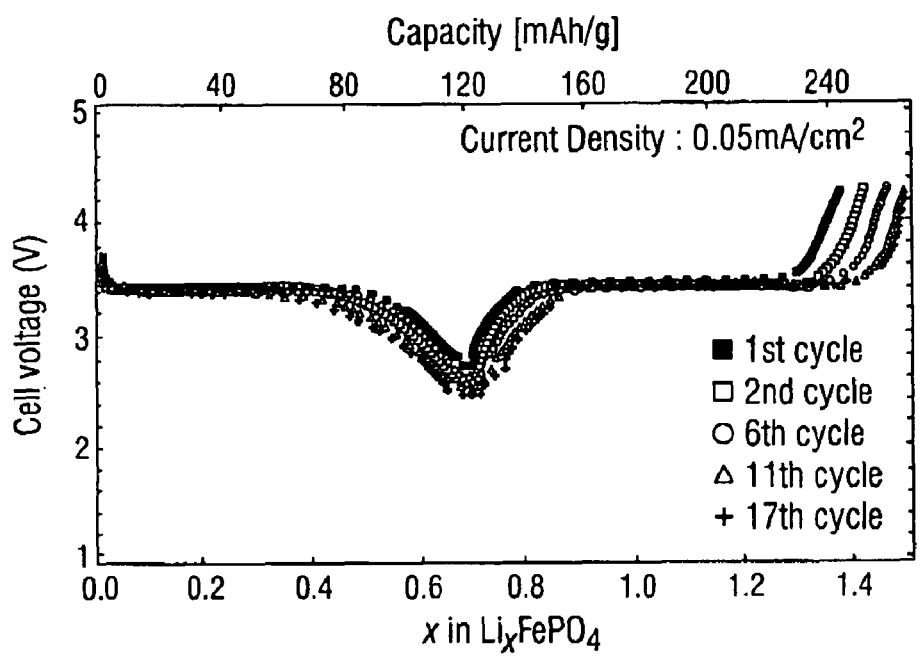
FIG. 3 shows discharge/charge curves of an $FePO_4$/$LiClO_4$+PC+DME/Li coin cell at 185 mA·g$^{-1}$ for $FePO_4$ prepared by chemical extraction of Li (delithiation) from $LiFePO_4$.

Insertion of lithium into $FePO_4$ was reversible over the several cycles studied. FIG. 3 shows discharge/charge curves of $FePO_4/LiClO_4+PC+DME/Li$ coin cell at 185 $mA \cdot g^{-1}$ for $FePO_4$ prepared by chemical extraction of Li (delithiation) from $LiFePO_4$. The $Li_xFePO_4$ material of the present invention represents a cathode of good capacity and contains inexpensive, environmentally benign elements. While a nearly close-packed-hexagonal oxide-ion array apparently provides a relatively small free volume for $Li^+$-ion motion, which would seem to support only relatively small current densities at room temperature, increasing the current density does not lower the closed-circuit voltage V. Rather, it decreases, reversibly, the cell capacity. Capacity is easily restored by reducing the current.

Figure 4:
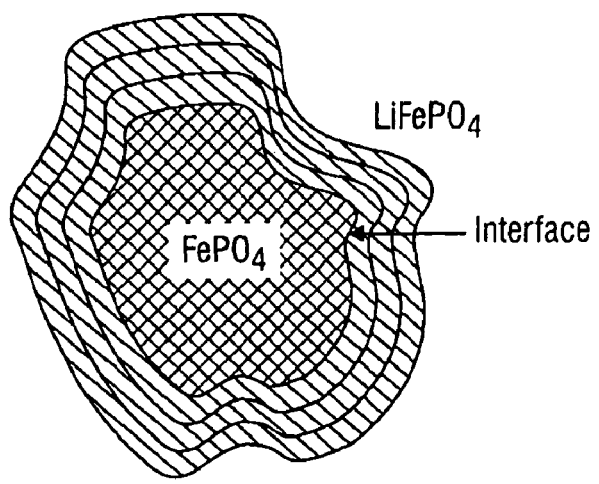
FIG. 4 shows a schematic representation of the motion of $LiFePO_4$/$FePO_4$ interface on lithium insertion in to a particle of $FePO_4$.

As illustrated schematically in FIG. 4, lithium insertion proceeds from the surface of the particle moving inwards behind a two-phase interface. In the system shown, it is a $Li_xFePO_4/Li_{1-x}FePO_4$ interface. As the lithiation proceeds, the surface area of the interface shrinks. For a constant rate of lithium transport per unit area across the interface, a critical surface area is reached where the rate of total lithium transported across the interface is no longer able to sustain the current. At this point, cell performance becomes diffusion-limited. The higher the current, the greater is the total critical interface area and, hence, the smaller the concentration x of inserted lithium before the cell performance becomes diffusion-limited. On extraction of lithium, the parent phase at the core of the particle grows back towards the particle surface. Thus, the parent phase is retained on repeated cycling and the loss in capacity is reversible on lowering the current density delivered by the cell. Therefore, this loss of capacity does not appear to be due to a breaking of the electrical contact between particles as a result of volume changes, a process that is normally irreversible. Moreover, the problem of decrease of capacity due to the particles' breaking of electrical contact may be overcome by reducing the particle size of the cathode material to the nanometer scale.

The invention further provides new cathode materials exhibiting a rhombohedral NASICON framework. NASICON, as used herein, is an acronym for the framework host of a sodium superionic conductor $Na_{1+3x}Zr_2(P_{1-x}Si_xO_4)_3$. The compound $Fe_2(SO_4)_3$ has two forms, a rhombohedral NASICON structure and a related monoclinic form (Goodenough et al. 1976; Long et al. 1979). Each structure contains units of two $FeO_6$ octahedra bridged by three corner-sharing $SO_4$ tetrahedra. These units form 3D frameworks by the bridging $SO_4$ tetrahedra of one unit sharing corners with $FeO_6$ octahedra of neighboring $Fe_2(SO_4)_3$ elementary building blocks so that each tetrahedron shares corners with only octahedra and each octahedron with only tetrahedra. In the rhombohedral form, the building blocks are aligned parallel, while they are aligned nearly perpendicular to one another in the monoclinic phase. The collapsed monoclinic form has a smaller free volume for $Li^+$-ion motion which is why the rhombohedral form is preferred. In these structures, the $FeO_6$ octahedra do not make direct contact, so electron transfer from an $Fe^{2+}$ to an $Fe^{3+}$ ion is polaronic and therefore activated.

$Li_xFe_2(SO_4)_3$ has been reported to be a candidate material for the cathode of a $Li^+$-ion rechargeable battery with a $V_{OC}$=3.6 V vs. a lithium anode (Manthiram and Goodenough 1989). While the sulfates would seem to provide the desired larger free volume for Li, batteries using sulfates in the cathode material tend to exhibit phase-transition problems, lowering the electronic conductivity. The reversible lithium insertion into both rhombohedral and monoclinic $Fe_2(SO_4)_3$ gives a flat closed-circuit voltage vs. a lithium anode of 3.6 V (Manthiram and Goodenough 1989; Okada et al. 1994; Nanjundaswamy et al. 1996). Neither parent phase has any significant solid solution with the orthorhombic lithiated phase $Li_2Fe_2(SO_4)_3$, which is derived from the rhombohedral form of $Fe_2(SO_4)_3$ by a displacive transition that leaves the framework intact. Powder X-ray diffraction verifies that lithiation occurs via a two-phase process (Nanjundaswamy et al. 1996). Increasing the current density does not change significantly the closed-circuit voltage V, but it does reduce reversibly the capacity. The reduction in capacity for a given current density is greater for the motion of the lithiated interface. The interstitial space of the framework allows fast $Li^+$-ion motion, but the movement of lithium across the orthorhombic/monoclinic interface is slower than that across the orthorhombic/rhombohedral interface, which makes the reversible loss of capacity with increasing current density greater for the monoclinic than for the rhombohedral parent phase.

Figure 5A:
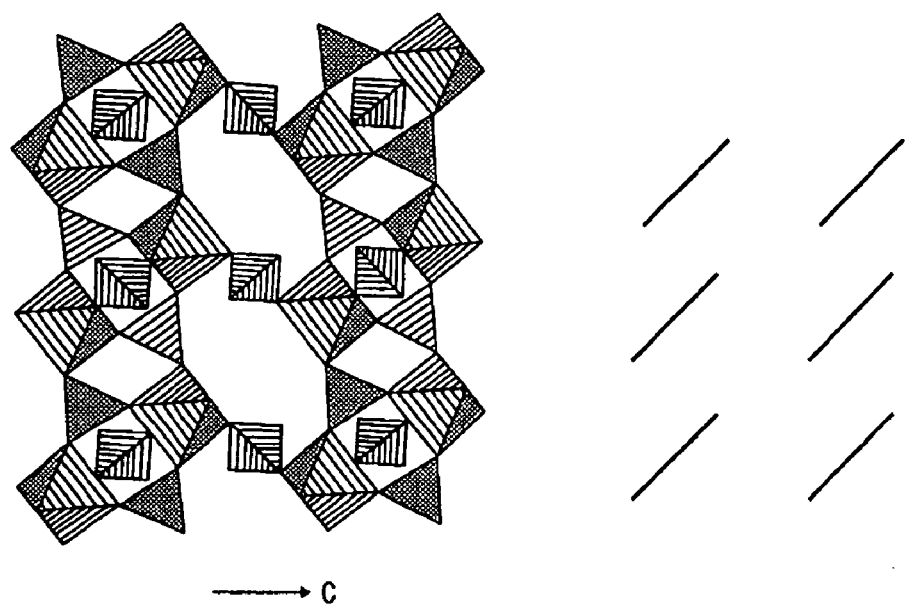
FIGS. 5A and 5B.
Figure 5B:
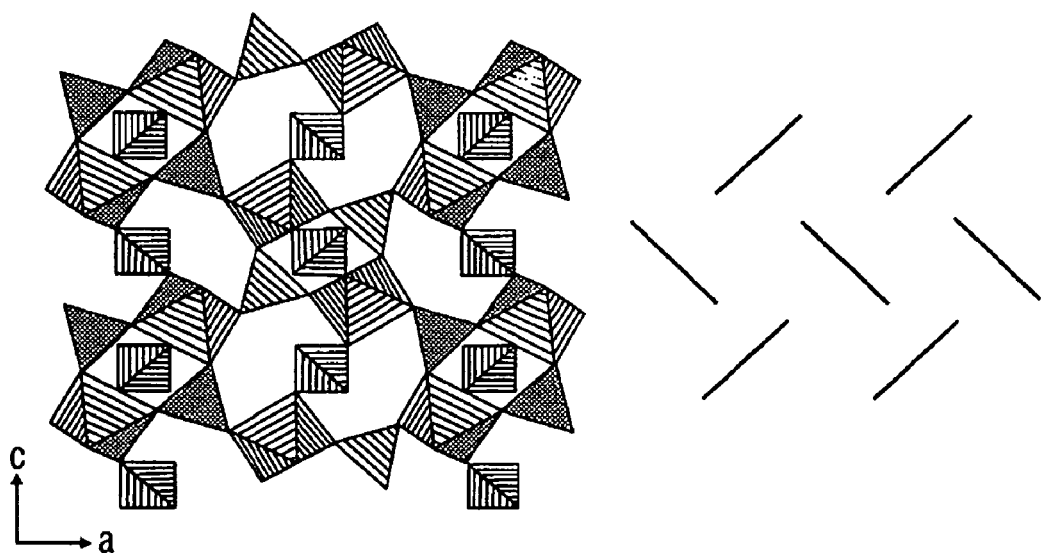

The cathode materials of the invention avoid the phase transition of known sulfate cathode materials by incorporating one or more phosphate ions as at least one of the constituents of the cathode material. The rhombohedral R3c (NASICON) and monoclinic $P2_1/n$ framework structures of $Li_3Fe_2(PO_4)_3$ are similar to those for the sulfates described above, as illustrated in FIG. 5A and FIG. 5B.

A further embodiment of the invention is a rhombohedral NASICON cathode material having the formula $A_{3-x}V_2(PO_4)_3$, where A may be Li, Na or a combination thereof. Rhombohedral $A_{3-x}V_2(PO_4)_3$ reversibly intercalates 1.5 Li per formula unit for a discharge capacity of 100 mAh·g$^{-1}$ with average closed-circuit voltage being 3.8 V vs. a lithium anode (see FIG. 8). The voltage and capacity performances of the rhombohedral $A_{3-x}V_2(PO_4)_3$ compounds of the invention are comparable to the high-voltage cathode materials $LiMn_2O_4$ (4.0 V), $LiCoO_2$ (4.0 V) and $LiNiO_2$ (4.0 V). The large, open three-dimensional framework of $VO_6$ octahedra and $PO_4$ tetrahedra allows an easy diffusion of the lithium ions, making it attractive for high-power batteries. A further advantage of this material is that it includes a cheaper and less toxic transition-metal element (V) than the already developed systems using Co, Ni, or Mn.

EXAMPLES

Example 1

Ordered Olivine $LiMPO_4$ Compounds

The ordered-olivine compound $LiFePO_4$ was prepared from intimate mixtures of stoichiometric proportions of $Li_2CO_3$ or $LiOH·H_2O$, $Fe(CH_3CO_2)_2$ and $NH_4H_2PO_4·H_2O$; the mixtures were calcined at 300-350° C. to eliminate $NH_3$, $H_2O$, and $CO_2$ and then heated in Ar at about 800° C. for 24 hours to obtain $LiFePO_4$. Similar solid-state reactions were used to prepare $LiMnPO_4$, $LiFe_{1-x}Mn_xPO_4$, $LiCoPO_4$ and $LiNiPO_4$. $FePO_4$ was obtained from $LiFePO_4$ by chemical extraction of Li from $LiFePO_4$. Charge/discharge curves for $Li_{1-x}FePO_4$ and discharge/charge cycles for $Li_xFePO_4$ gave similar results with a voltage of almost 3.5 V vs. lithium for a capacity of 0.6 Li/formula unit at a current density of 0.05 mA·cm$^{-2}$ (See FIG. 2A and FIG. 2C). The electrolyte used had a window restricting voltages to V<4.3 V. Li extraction was not possible from $LiMnPO_4$, $LiCoPO_4$, and $LiNiPO_4$ with the electrolyte used because these require a voltage V>4.3 V to initiate extraction. However, Li extraction from $LiFe_{1-x}Mn_xPO_4$ was performed with $0 \leq x \leq 0.5$, and the $Mn^{3+}/Mn^{2+}$ couple produced a voltage plateau at 4.0 V vs. lithium.

Arsenate may be substituted for at least some of the phosphate in $LiFePO_4$. The iron in $LiFePO_4$ may be supplemented up to 10% by other metals such as those filled with two electron shells, manganese or titanium, for example.

This iron-based material is non-toxic, inexpensive, non-hygroscopic, easy to prepare and has good electronic conductivity compared to existing high voltage cathode materials. There is a decrease in the volume of the unit cell with the extraction of lithium from $LiFePO_4$. At higher current densities, there is a decrease of capacity on repeated cycling associated with movement of a two-phase interface, a feature characteristic of cathodes that traverse a two-phase compositional domain in a discharge cycle. The volume change across the two-phase interface causes the particles to crack and lose electrical contact with the current collector. This problem can be overcome by reducing the particle size of the cathode material to the nanometer scale.

Example 2

Rhombohedral NASICON $Li_xM_2(PO_4)_3$ Structures

The inventors compared redox energies in isostructural sulfates with phosphates to obtain the magnitude of the change due to the different inductive effects of sulfur and phosphorus. Rhombohedral $Li_{1+x}Ti_2(PO_4)_3$ has been shown to exhibit a flat open-circuit voltage $V_{OC}$=2.5 V vs. lithium, which is roughly 0.8 V below the $Ti^{4+}/Ti^{3+}$ level found for $FeTi(SO_4)_3$. The flat voltage V(x) is indicative of a two-phase process. A co-existence of rhombohedral and orthorhombic phases was found for x=0.5 (Delmas and Nadiri 1988; Wang and Hwu 1992). $Li_{2+x}FeTi(PO_4)_3$ of the present invention remains single phase on discharge.

Figure 6A:
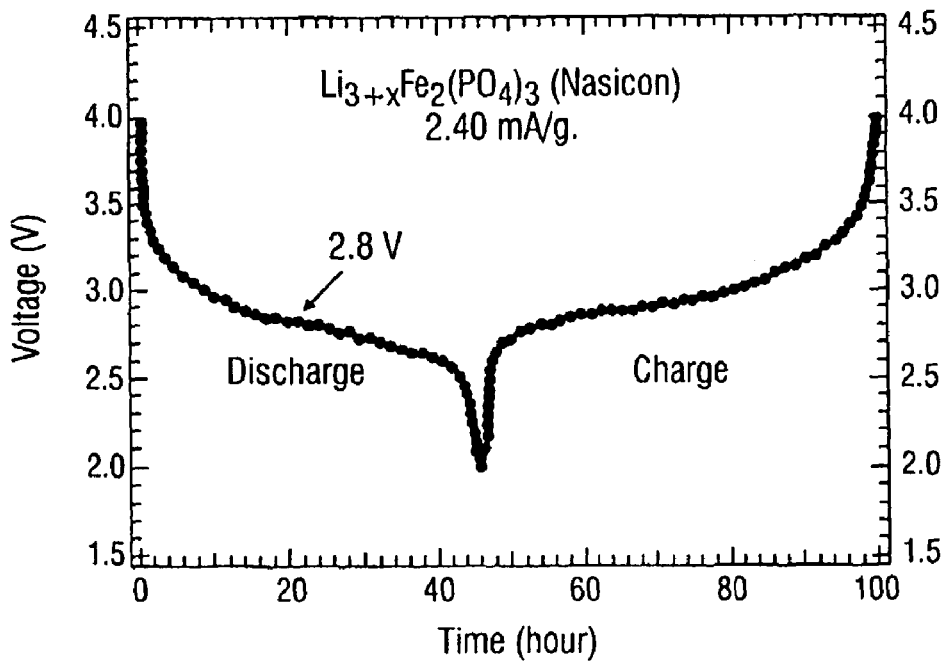
FIGS. 6A and 6B.
Figure 6B:
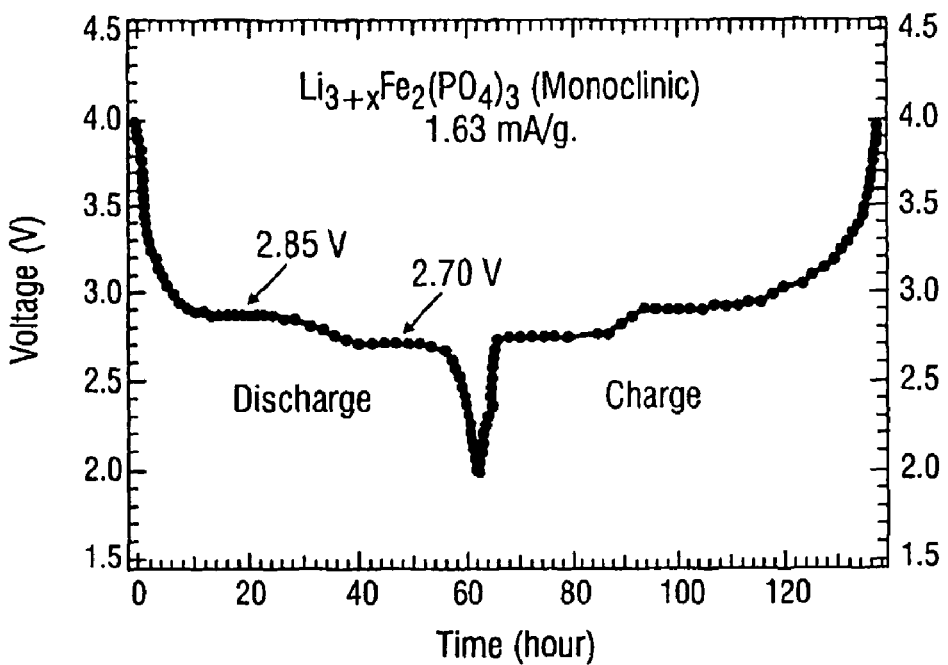
Figure 7A:
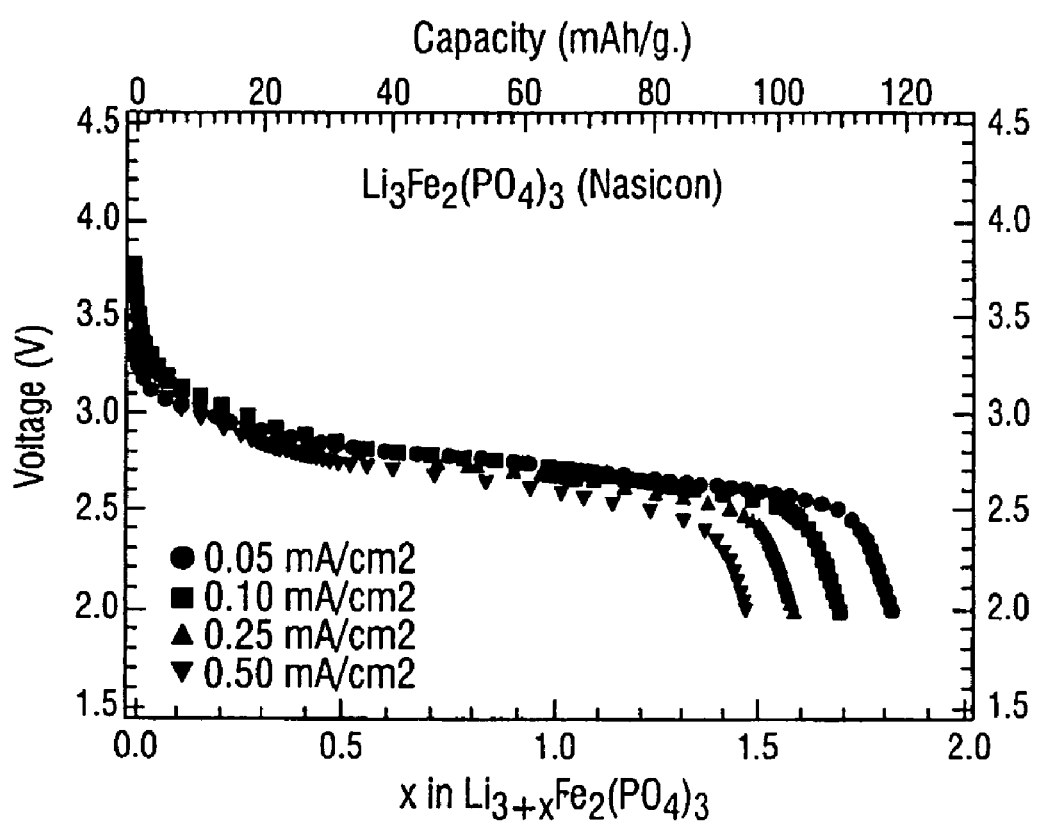
FIGS. 7A and 7B.
Figure 7B:
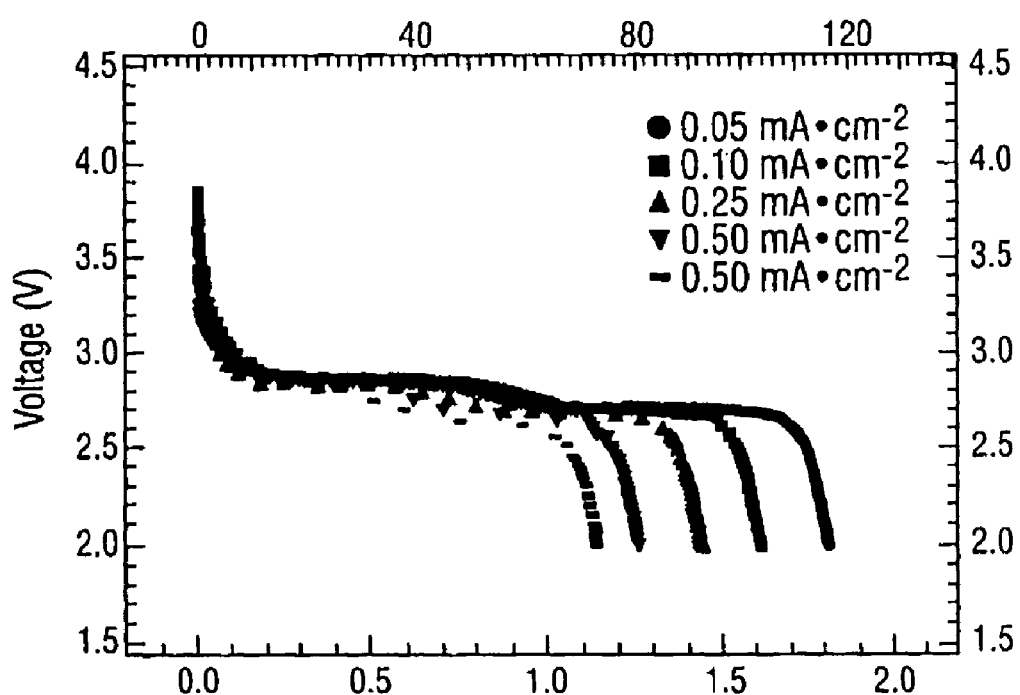

All three phosphates $Li_3M_2(PO_4)_3$, where M=Fe, Fe/V, or V, have the monoclinic $Fe_2(SO_4)_3$ structure if prepared by solid-state reaction. The inventors have found that these compounds exhibit a rhombohedral structure when prepared by ion exchange in $LiNO_3$ at 300° C. from the sodium analog $NaFe_2(PO_4)_3$. The discharge/charge curve of FIG. 6A for lithium insertion into rhombohedral $Li_{3+x}Fe_2(PO_4)_3$ exhibits an average $V_{OC}$ of 2.8 V. This is surprisingly different from the curves for the monoclinic form (See FIG. 6B). The inventors have found that up to two lithiums per formula unit can be inserted into $Li_3Fe_2(PO_4)_3$, leading to $Li_5Fe_2(PO_4)_3$. The $Li^+$-ion distribution in the interstitial space of $Li_{3+x}Fe_2(PO_4)_3$, where 0<x<2, appears to vary continuously with x with a high degree of disorder. FIG. 7A shows a reversible capacity loss on increasing the current density from 0.05 to 0.5 mA·cm$^{-2}$. A reversible discharge capacity of 95 mAh·g$^{-1}$ is still observed for rhombohedral $Li_{3+x}Fe_2(PO_4)_3$ at a current density of 20 mA·g$^{-1}$. This is much reduced compared to what is encountered with the monoclinic system (See FIG. 7B). With a current density of 23 mA·g$^{-1}$ (or 1 mA·cm$^{-2}$), the initial capacity of 95 mAh·g$^{-1}$ was maintained in a coin cell up to the 40$^{th}$ cycle.

Another cathode material of the present invention, $Li_2FeTi(PO_4)_3$, having the NASICON framework was prepared by solid-state reaction. This material has a voltage ranging from 3.0 to 2.5 V.

Rhombohedral $TiNb(PO_4)_3$ can be prepared by solid-state reaction at about 1200° C. Up to three Li atoms per formula unit can be inserted, which allows access to the $Nb^{4+}/Nb^{3+}$ couple at 1.8 V vs. lithium for x>2 in $Li_xTiNb(PO_4)_3$. Two steps are perhaps discernible in the compositional range $0<x<2$; one in the range of $0<x<1$ corresponds to the $Ti^{4+}/Ti^{3+}$ couple in the voltage range $2.5 V<V<2.7 V$ and the other for $1<x<2$ to the $Nb^{5+}/Nb^{4+}$ couple in the range $2.2 V<V<2.5 V$. It appears that these redox energies overlap. This assignment is based on the fact that the $Ti^{4+}/Ti^{3+}$ couple in $Li_{1+x}Ti_2(PO_4)_3$ gives a flat plateau at 2.5 V due to the presence of two phases, rhombohedral $LiTi_2(PO_4)_3$ and orthorhombic $Li\,Ti_2(PO_4)_3$. The presence of Nb in the structure suppresses the formation of the second phase in the range $0<x<2$.

Rhombohedral $LiFeNb(PO_4)_3$ and $Li_2FeTi(PO_4)_3$ can be prepared by ion exchange with molten $LiNO_3$ at about 300° C. from $NaFeNb(PO_4)_3$ and $Na_2FeTi(PO_4)_3$, respectively. Two Li atoms per formula unit can be inserted reversibly into $Li_{2+x}FeTi(PO_4)_3$ with a little loss of capacity at $0.5\,mA\cdot cm^{-2}$. Insertion of the first Li atom in the range $2.7 V<V<3.0 V$ corresponds to the $Fe^{3+}/Fe^{2+}$ redox couple and of the second Li atom in the range of $2.5 V<V<2.7 V$ to an overlapping $Ti^{4+}/Ti^{3+}$ redox couple. The insertion of lithium into $Li_{1+x}FeNb(PO_4)_3$ gives a V vs. x curve that further verifies the location of the relative positions of the $Fe^{3+}/Fe^{2+}$, $Nb^{5+}/Nb^{4+}$ redox energies in phosphates with NASICON-related structures. It is possible to insert three lithium atoms into the structure, and there are three distinct plateaus corresponding to $Fe^{3+}/Fe^{2+}$ at 2.8 V, $Nb^{5+}/Nb^{4+}$ at 2.2 V, and $Nb^{4+}/Nb^{5+}$ at 1.7 V vs. lithium in the discharge curve.

Figure 8:
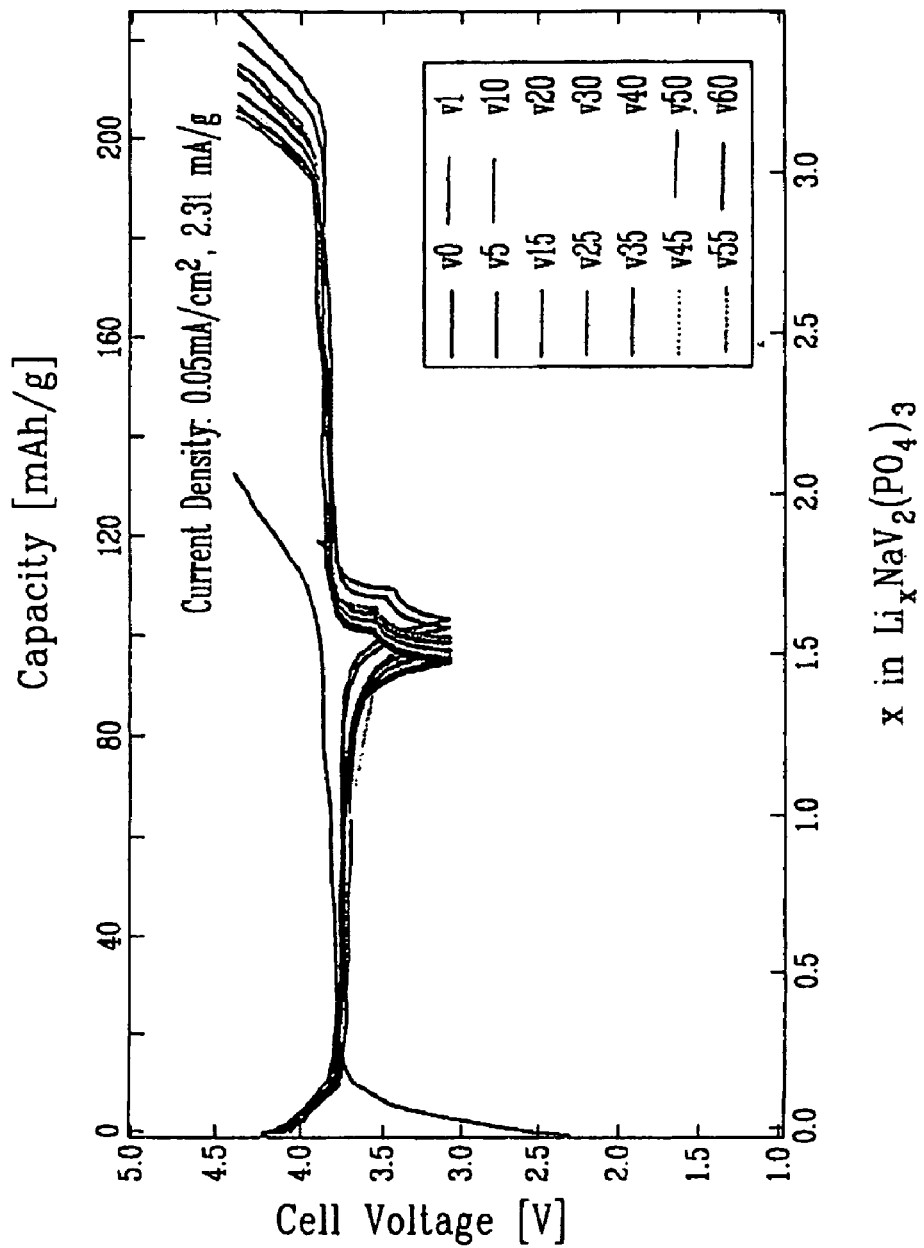
FIG. 8 shows discharge/charge curves at 0.05 mA·cm$^{-2}$ (0.95 mA·g$^{-1}$) for the rhombohedral $Li_2NaV_2(PO_4)_3$. Rhombohedral $Li_2NaV_2(PO_4)_3$ reversibly intercalates 1.5 Li per formula unit for a discharge capacity of 100 mAh·g$^{-1}$ with average closed-circuit voltage of 3.8 V vs. a lithium anode.
Figure 9:
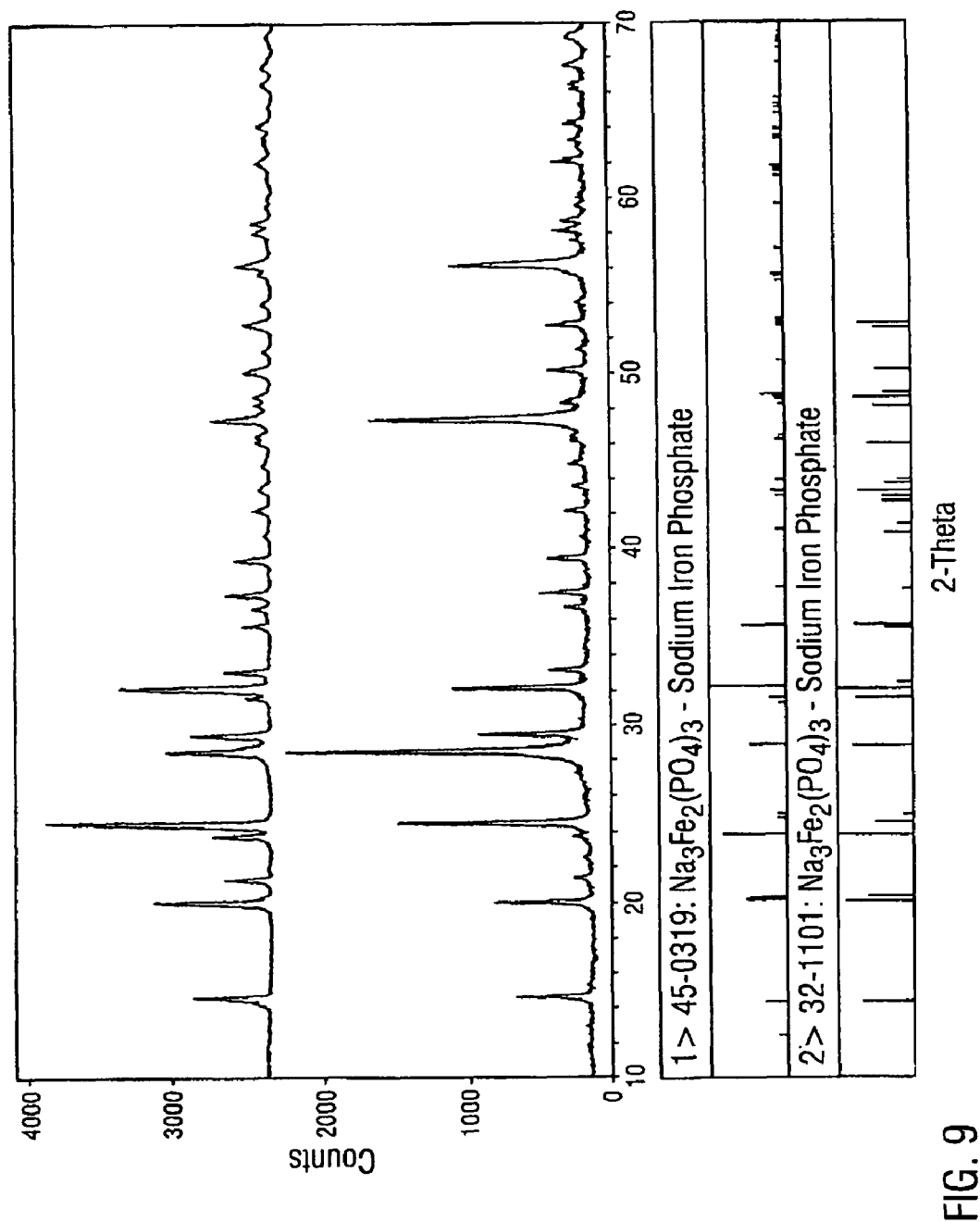
FIG. 9 illustrates the solid-state synthesis of $Li_2NaV_2(PO_4)_3$ having the rhombohedral NASICON framework.

The rhombohedral $A_{3-x}V_2(PO_4)_3$ compounds of the invention can be prepared by ionic exchange from the monoclinic sodium analog $Na_3V_2(PO_4)_3$. The inventors were also able to prepare the rhombohedral $Li_2NaV_2(PO_4)_3$ with the NASICON framework by a direct solid-state reaction (FIG. 9). The discharge/charge curves at $0.05\,mA\cdot cm^{-2}$ ($0.95\,mA\cdot g^{-1}$) for the rhombohedral $Li_xNaV_2(PO_4)_3$ are shown in FIG. 8.

Figure 10:
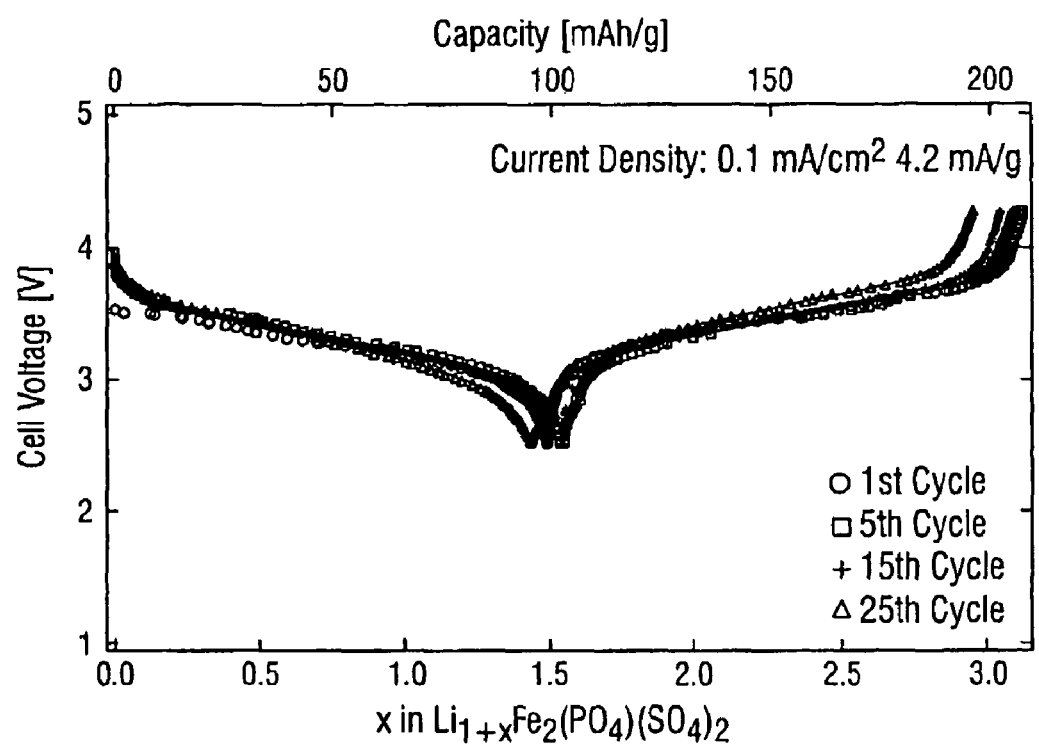
FIG. 10 shows discharge/charge curves vs. lithium at 0.1 mA·cm$^{-2}$ for rhombohedral $Li_{1+x}Fe_2(PO_4)(SO_4)_2$ where $0 \leq x \leq 2$.

The rhombohedral $LiFe_2(SO_4)_2(PO_4)$ may be prepared by obtaining an aqueous solution comprising $FeCl_3$, $(NH_4)_2SO_4$, and $LiH_2PO_4$, stirring the solution and evaporating it to dryness, and heating the resulting dry material to about 500° C. Discharge/charge curves vs. lithium at $0.1\,mA\cdot cm^{-2}$ for rhombohedral $Li_{1+x}Fe_2(PO_4)(SO_4)_2$, where $0<x<3$, are shown in FIG. 10.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. More specifically, it will be apparent that certain agents which are both chemically and structurally related may be substituted for the agents described herein to achieve similar results. All such substitutions and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference:

Delmas, C., and A. Nadiri, *Mater. Res. Bull.*, 23, 63 (1988);
Goodenough, J. B., H. Y. P. Hong and J. A. Kafalas, *Mater. Res. Bull.* 11, 203, (1976);
Guyomard, D. and J. M. Tarascon, *J. Electrochem. Soc.*, 139, 937 (1992);
Long, G. J., G. Longworth, P. Battle, A. K. Cheetham, R. V. Thundathil and D. Beveridge, *Inorg. Chem.*, 18, 624 (1979);
Manthiram, A., and J. B. Goodenough, *J. Power Sources*, 26, 403 (1989);
Masquelier, C., M. Tabuchi, K. Ado, R. Kanno, Y. Kobayashi, Y. Maki, O. Nakamura and J. B. Goodenough, *J. Solid State Chem.*, 123, 255 (1996);
Mizushima, K., P. C. Jones, P. J. Wiseman and J. B. Goodenough, *Mater. Res. Bull.*, 15, 783 (1980);
Nanjundaswamy, K. S., et al., "Synthesis, redox potential evaluation and electrochemical characteristics of NASICON-related 3D framework compounds," *Solid State Ionics*, 92 (1996) 1-10;
Nishi, Y., H. Azuma and A. Omaru, U.S. Pat. No. 4,959,281, Sep. 25, 1990;
Okada, S., K. S. Nanjundaswamy, A. Manthiram and J. B. Goodenough, *Proc. 36th Power Sources Conf.*, Cherry Hill at New Jersey (Jun. 6-9, 1994);
Schöllhorn, R. and A. Payer, *Agnew. Chem.* (Int. Ed. Engl.), 24, 67 (1985);
Sinha, S. and D. W. Murphy, *Solid State Ionics*, 20, 81 (1986);
Thackeray, M. M. W. I. F. David, J. B. Goodenough and P. Groves, *Mater. Res. Bull.*, 20, 1137 (1983);
Thackeray, M. M., P. J. Johnson, L. A. de Piciotto, P. G. Bruce and J. B. Goodenough, *Mater. Res. Bull.*, 19, 179 (1984);
Thackeray, M. M., W. I. F. David, P. G. Bruce and J. B. Goodenough, *Mater. Res. Bull.* 18, 461 (1983); and
Wang, S., and S. J. Hwu, *Chem. of Mater.* 4, 589 (1992).

What is claimed is:

1. A method of preparing $LiFePO_4$ having an olivine structure comprising:
    mixing stoichiometric proportions of a source of lithium, a source of iron, and a source of phosphorus to form a source mixture;
    heating the source mixture to a temperature and for a period of time sufficient to allow a solid-state reaction to occur so as to form $LiFePO_4$ having an olivine structure.

2. The method according to claim 1, further comprising removing $NH_3$, $H_2O$ and $CO_2$ from the source mixture prior to heating.

3. The method according to claim 2, further comprising calcining the source mixture to remove $NH_3$, $H_2O$ and $CO_2$ prior to heating.

4. The method according to claim 3, further comprising calcining the source mixture at a temperature of between 300-350° C.

5. The method according to claim 1, wherein heating comprises heating the source mixture to a temperature of about 800° C.

6. The method according to claim 1, wherein the period of time is approximately 24 hours.

7. A method of preparing a delithiated olivine $FePO_4$ compound comprising:
    mixing stoichiometric proportions of a source of lithium, a source of iron, and a source of phosphorus to form a source mixture;
    heating the source mixture to a temperature and for a period of time sufficient to allow a solid-state reaction to occur so as to form $LiFePO_4$ having an olivine structure; and
    chemically extracting lithium ions from the $LiFePO_4$ to form the delithiated olivine $FePO_4$ compound.

8. The method according to claim 7, further comprising removing $NH_3$, $H_2O$ and $CO_2$ from the source mixture prior to heating.

9. The method according to claim 8, further comprising calcining the source mixture to remove $NH_3$, $H_2O$ and $CO_2$ prior to heating.

10. The method according to claim 9, further comprising calcining the source mixture at a temperature of between 300-350° C.

11. The method according to claim 7, wherein heating comprises heating the source mixture to a temperature of about 800° C.

12. The method according to claim 7, wherein the period of time is approximately 24 hours.

13. A method of preparing a delithiated olivine $FePO_4$ compound comprising:
mixing stoichiometric proportions of a source of lithium, a source of iron, and a source of phosphorus to form a source mixture;
heating the source mixture to a temperature and for a period of time sufficient to allow a solid-state reaction to occur so as to form $LiFePO_4$ having an olivine structure; and
electrochemically extracting lithium ions from the $LiFePO_4$ to form the delithiated olivine $FePO_4$ compound.

14. The method according to claim 13, further comprising removing $NH_3$, $H_2O$ and $CO_2$ from the source mixture prior to heating.

15. The method according to claim 14, further comprising calcining the source mixture to remove $NH_3$, $H_2O$ and $CO_2$ prior to heating.

16. The method according to claim 15, further comprising calcining the source mixture at a temperature of between 300-350° C.

17. The method according to claim 14, wherein heating comprises heating the source mixture to a temperature of about 800° C.

18. The method according to claim 14, wherein the period of time is approximately 24 hours.

* * * * *